United States Patent
Sridhara et al.

(10) Patent No.: US 9,491,187 B2
(45) Date of Patent: Nov. 8, 2016

(54) APIS FOR OBTAINING DEVICE-SPECIFIC BEHAVIOR CLASSIFIER MODELS FROM THE CLOUD

(71) Applicant: QUALCOMM Incorporated, San Diego, CA (US)

(72) Inventors: Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/157,606

(22) Filed: Jan. 17, 2014

(65) Prior Publication Data

US 2014/0237595 A1 Aug. 21, 2014

Related U.S. Application Data

(60) Provisional application No. 61/765,461, filed on Feb. 15, 2013, provisional application No. 61/874,109, filed on Sep. 5, 2013, provisional application No. 61/890,643, filed on Oct. 14, 2013.

(51) Int. Cl.
*H04L 29/00* (2006.01)
*H04L 29/06* (2006.01)
(Continued)

(52) U.S. Cl.
CPC .......... *H04L 63/1408* (2013.01); *G06F 21/50* (2013.01); *G06F 21/55* (2013.01);
(Continued)

(58) Field of Classification Search
CPC ............................. H04L 63/14; G06F 21/05
USPC ...................... 726/22–25; 713/100, 187–188
See application file for complete search history.

(56) References Cited

U.S. PATENT DOCUMENTS

| 5,870,735 A | 2/1999 | Agrawal et al. |
| 6,532,541 B1 | 3/2003 | Chang et al. |

(Continued)

FOREIGN PATENT DOCUMENTS

| CN | 1961525 A | 5/2007 |
| CN | 102202102 A | 9/2011 |

(Continued)

OTHER PUBLICATIONS

Caruana, et al., "An Empirical Comparison of Supervised Learning Algorithms", ICML, 2006, 8 pgs.
(Continued)

*Primary Examiner* — Madhuri Herzog
(74) *Attorney, Agent, or Firm* — The Marbury Law Group, PLLC

(57) ABSTRACT

The various aspects provide a system and methods implemented on the system for generating a behavior model on a server that includes features specific to a mobile computing device and the device's current state/configuration. In the various aspects, the mobile computing device may send information identifying itself, its features, and its current state to the server. In response, the server may generate a device-specific lean classifier model for the mobile computing device based on the device's information and state and may send the device-specific lean classifier model to the device for use in detecting malicious behavior. The various aspects may enhance overall security and performance on the mobile computing device by leveraging the superior computing power and resources of the server to generate a device-specific lean classifier model that enables the device to monitor features that are actually present on the device for malicious behavior.

20 Claims, 11 Drawing Sheets

(51) Int. Cl.

| | | |
|---|---|---|
| G06F 21/56 | (2013.01) | |
| G06F 21/55 | (2013.01) | |
| G06F 21/50 | (2013.01) | |
| H04L 29/08 | (2006.01) | |
| G06N 5/04 | (2006.01) | |
| H04W 4/00 | (2009.01) | |

(52) U.S. Cl.
CPC ............ *G06F 21/56* (2013.01); *G06F 21/566* (2013.01); *G06N 5/043* (2013.01); *H04L 63/20* (2013.01); *H04L 67/10* (2013.01); *H04L 67/303* (2013.01); *H04L 63/14* (2013.01); *H04W 4/00* (2013.01)

(56) References Cited

U.S. PATENT DOCUMENTS

| | | |
|---|---|---|
| 6,643,802 B1 | 11/2003 | Frost et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,852,938 B2 | 12/2010 | Shi et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 * | 6/2012 | McCallam ............ 726/23 |
| 8,225,093 B2 | 7/2012 | Fok et al. |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1 | 4/2014 | Glick et al. |
| 8,762,298 B1 | 6/2014 | Ranjan et al. |
| 8,763,127 B2 | 6/2014 | Yao et al. |
| 8,775,333 B1 | 7/2014 | Zahn |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0174490 A1 | 7/2007 | Choi et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 | 7/2008 | Kalaboukis et al. |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0019551 A1 | 1/2009 | Haga et al. |
| 2009/0192955 A1 | 7/2009 | Tang et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 * | 11/2009 | Adelstein et al. ............ 726/22 |
| 2009/0300765 A1 | 12/2009 | Moskovitch et al. |
| 2009/0327168 A1 | 12/2009 | Weinberger et al. |
| 2010/0011029 A1 | 1/2010 | Niemelae |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1 | 6/2011 | Mahaffey et al. |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 * | 9/2012 | Baliga et al. ............ 726/23 |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |

(56) References Cited

U.S. PATENT DOCUMENTS

| | | |
|---|---|---|
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0205099 A1 | 7/2014 | Christodorescu et al. |
| 2014/0245306 A1 | 8/2014 | Gathala |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0356462 A1 | 12/2015 | Fawaz et al. |
| 2016/0088009 A1 | 3/2016 | Gupta et al. |

FOREIGN PATENT DOCUMENTS

| | | |
|---|---|---|
| CN | 102591696 A | 7/2012 |
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| KR | 20060033067 A | 4/2006 |
| TW | 200937198 A | 9/2009 |
| TW | 201129817 A | 9/2011 |
| TW | 201239618 A | 10/2012 |
| WO | 2006012375 | 2/2006 |
| WO | 2010048502 | 4/2010 |
| WO | WO-2010126416 A1 | 11/2010 |
| WO | WO-2011147580 A1 | 12/2011 |
| WO | WO-2013016692 | 1/2013 |
| WO | WO-2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Caruana, et al., "An Empirical Evaluation of Supervised Learning in High Dimensions", ICML, 2008, 8 pgs.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.

Qin F., "System Support for Improving Software Dependability During Production Runs," Urbana, Illinois, 1998, pp. 1-116.

Shabtai A., et al., "Dectecting unknown malicious code by applying classification techniques on OpCode Patterns," Security Informatics a Springer Open Journal, 2012, vol. 1 (1), pp. 1-22.

Shabtai A., "Malware Detection on Mobile Devices," Eleventh International Conference on Mobile Data Management, IEEE Computer Society, 2010, pp. 289-290.

Sheen S., et al., "Network Intrusion Detection using Feature Selection and Decision tree classifier," TENCON—IEEE Region 10 Conference, 2008, pp. 1-4.

Wang Y-M., et al., "STRIDER: A Black-Box, State-based Approach to Change and Configuration Management and Support," 2003 LISA XVII—Oct. 26-31, 2003—San Diego, CA, pp. 165-178.

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.

Jean E., et al., "Boosting-based distributed and adaptive security-monitoring through agent collaboration", Proceedings of the 2007 IEEEN/WIC/ACM International Conferences on Web Intelligence and Intelligent Agent Technology Workshops (WI-IATW07), Nov. 5, 2007, pp. 516-520, XP031200055, DOI: 10.1109/WI-IATW.2007.52 the whole document.

Kachirski O., et al., "Effective Intrusion Detection Using Windows Sensors in Wireless Ad Hoc Networks", IEEE Proceedings of the 36th Hawaii International Conference on System Sciences, 2002, 8 Pages.

Kirda E., et al., "Behavior-Based Spyware Detection", 15th USENIX Security Symposium, 2002, pp. 273-288.

Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.

Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.

Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.

Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.

(56) References Cited

OTHER PUBLICATIONS

De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.
Kolter J.Z., et al., "Learning to Detect Malicious Executables in the Wild", ACM Knowl. Discovery and Data Mining (KDD), 2004, pp. 470-478.
Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.
Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 13, 2013] the whole document.

Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]-paragraph [5.3.4].
Kaspersky Endpoint Security 8 for Smartphone Program Version 8.0, Updated on Feb. 8, 2012.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9-12, 1999.
Tan, P.N., et al., "Introduction to data mining," Library of Congress, 2006, Chapter 4.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27-Aug. 1, 2008, pp. 160-165.
Faddoul J.B., et al., "Boosting Multi-Task Weak Learners with Applications to Textual and Social Data," Ninth International Conference on Machine Learning and Applications (ICMLA), Dec. 2010, pp. 367-372.

\* cited by examiner

APIS FOR OBTAINING DEVICE-SPECIFIC BEHAVIOR CLASSIFIER MODELS FROM THE CLOUD

RELATED APPLICATIONS

This application claims the benefit of priority to U.S. Provisional Patent Application No. 61/765,461 entitled "On-Line Behavioral Analysis Engine in Mobile Device with Multiple Analyzer Model Providers" filed Feb. 15, 2013; U.S. Provisional Application No. 61/874,109, entitled "Dynamic Device-Specific and Device-State-Specific Classifier" filed Sep. 5, 2013; and U.S. Provisional Application No. 61/890,643, entitled "APIs for Obtaining Device-Specific Behavior Classifier Models from the Cloud" filed Oct. 14, 2013, the entire contents of all of which are hereby incorporated by reference.

BACKGROUND

Cellular and wireless communication technologies have seen explosive growth over the past several years. This growth has been fueled by better communications, hardware, larger networks, and more reliable protocols. As a result wireless service providers are now able to offer their customers with unprecedented levels of access to information, resources, and communications.

To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile computing device's long-term and continued performance and power utilization levels. Accordingly, identifying and correcting the conditions and/or mobile computing device behaviors that may negatively impact the mobile computing device's long term and continued performance and power utilization levels is beneficial to consumers.

SUMMARY

The various aspects include servers and mobile computing devices configured to work in conjunction with one another to efficiently identify, classify, model, prevent, and/or correct the conditions and/or mobile computing device behaviors that often degrade a mobile computing device's performance and/or power utilization levels over time. The server may be configured to receive information on various capabilities, states, conditions, features, behaviors and corrective actions from a central database (e.g., the "cloud") and/or from many mobile computing devices, and use this information to generate a full classifier model (i.e., a data or behavior model) that describes a large corpus of behavior information in a format or structure (e.g., finite state machine, etc.) that can be quickly converted into one or more lean classifier models (e.g., classifier models used to evaluate a limited number of test conditions and/or features). The server may also be configured to receive information from the mobile computing devices that identifies their capabilities, current state and other device-specific information, and use this information to generate lean classifier models that focus on evaluating features that are most important to classifying behaviors on the specific mobile computing device.

The mobile computing device may be configured to receive and use these lean classifier models to identify, prevent, and/or correct the conditions, factors, and/or mobile computing device behaviors that contribute to degrading the performance and/or power utilization levels of the mobile computing device over time. The mobile computing device may also use the classifier models to generate even leaner classifier models locally in the mobile computing device.

By generating the lean classifier models to account for the capabilities and states of the mobile computing device, the various aspects allow the server to generate focused classifier models that may be used by the mobile computing device to focus its monitoring operations on the features or factors that are most important for identifying the source or cause of an undesirable or performance depredating mobile computing device behavior. This allows the mobile computing device to identify and respond to undesirable or performance degrading mobile computing device behaviors without causing a significant negative or user-perceivable change in the responsiveness, performance, or power consumption characteristics of the mobile computing device.

In an aspect, a server processor may store lean classifier models in a database and may associate the models with the set of features used to create the models and/or the mobile computing devices that have received the lean classifier models. The server processor may send a stored/cached lean classifier model to a mobile computing device requesting a classifier model in response to determining that the mobile computing device has a set of features that matches the features represented in the stored model. In another aspect, the server processor executing the model generator unit may periodically update stored lean classifier models to incorporate new or changed behavior data in the cloud data set.

In another aspect, a device-state monitoring engine operating on the mobile computing device may look for configuration and/or state changes that may impact the performance or effectiveness of the behavior analyzer unit (or a classifier module) to detect malicious behavior. The device-state monitoring engine may also notify a state-specific feature generator operating on the mobile computing device when the device-state monitoring engine detects a state change, and the state-specific feature generator may cause the mobile computing device to request an updated lean classifier model from the server based on the device's state change.

In another aspect, a device-feature monitoring engine operating on the mobile computing device may continually monitor for changes in the mobile computing device's functionality or capabilities (e.g., the addition or loss of capabilities associated with a peripheral device when the peripheral device is connected or disconnected). In response to detecting a functionality/capability change, the device-feature monitoring engine may notify a feature generator operating on the mobile computing device, and the feature generator may cause the mobile computing device to request an updated lean classifier model from the server based on the device's change in functionalities/capabilities.

The various aspects include a method of generating a lean classifier model on a server for use by a mobile computing device in monitoring for malicious behaviors by receiving on the server information from the mobile computing device identifying a capability and a state of the mobile computing device, generating on the server a lean classifier model based on the capability and the state of the mobile computing device from a cloud data set of information provided by a plurality of mobile computing devices, and sending the lean classifier model from the server to the mobile computing device. In an aspect, the method may further include determining on the server whether there is a stored lean classifier model associated with the capability and the state of the mobile computing device, and sending the lean classifier model from the server to the mobile computing device may include sending the stored lean classifier model from the server to the mobile computing device in response to determining that there is a stored classifier model associated with the capability and the state of the mobile computing device.

In another aspect, generating on the server a lean classifier model based on the capability and the state of the mobile computing device from a cloud data set of information provided by a plurality of mobile computing devices may include training the cloud data set of information with the information received from the mobile computing device identifying the capability and the state of the mobile computing device to produce the lean classifier model in the server. In another aspect, the method may also include storing the lean classifier model in the server, determining on the server whether to update the stored lean classifier model, training an updated cloud data set on the server with the information received from the mobile computing device identifying the capability and the state of the mobile computing device to produce an updated lean classifier model in response to determining to update the stored lean classifier model, and sending the updated lean classifier model from the server to the mobile computing device.

In another aspect, the method may also include determining on the mobile computing device a set of device-specific features associated with a capability present on the mobile computing device, determining on the mobile computing device a set of state-specific features associated with a state of the mobile computing device, generating the information identifying the capability and the state of the mobile computing device based on the set of device-specific features and the set of state-specific features, and sending the generated information from the mobile computing device to the server. In a further aspect, the method may also include determining on the mobile computing device whether there has been a change in functionality on the mobile computing device, determining on the mobile computing device whether there has been a change in state of the mobile computing device, updating the generated information in the mobile computing device based on detected changes in functionality and state, sending the updated information from the mobile computing device to the server, and receiving on the mobile computing device an updated lean classifier model from the server based on the updated information and in response to sending the updated information.

In another aspect, the method may also include receiving on the mobile computing device a user input indicating a capability and a state of the mobile computing device. In this aspect, determining on the mobile computing device a set of device-specific features associated with a capability present on the mobile computing device may include determining on the mobile computing device a set of device-specific features associated at least with the capability indicated by the user input, and determining on the mobile computing device a set of state-specific features associated with a state of the mobile computing device may include determining on the mobile computing device a set of state-specific features associated at least with the state indicated by the user input. In a further aspect, receiving on the mobile computing device a user input indicating a capability and a state of the mobile computing device may include receiving on the mobile computing device a user input indicating an anticipated capability and an anticipated state of the mobile computing device.

Further aspects include a server that may include a processor configured with processor-executable instructions to perform operations of aspect methods described above.

Further aspects include a system that may include a server having a server processor and a mobile computing device having a mobile device processor, in which the server processor is configured with processor-executable instructions to perform the server operations of aspect methods described above and the mobile device processor is configured with processor-executable instructions to perform the mobile device operations of aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
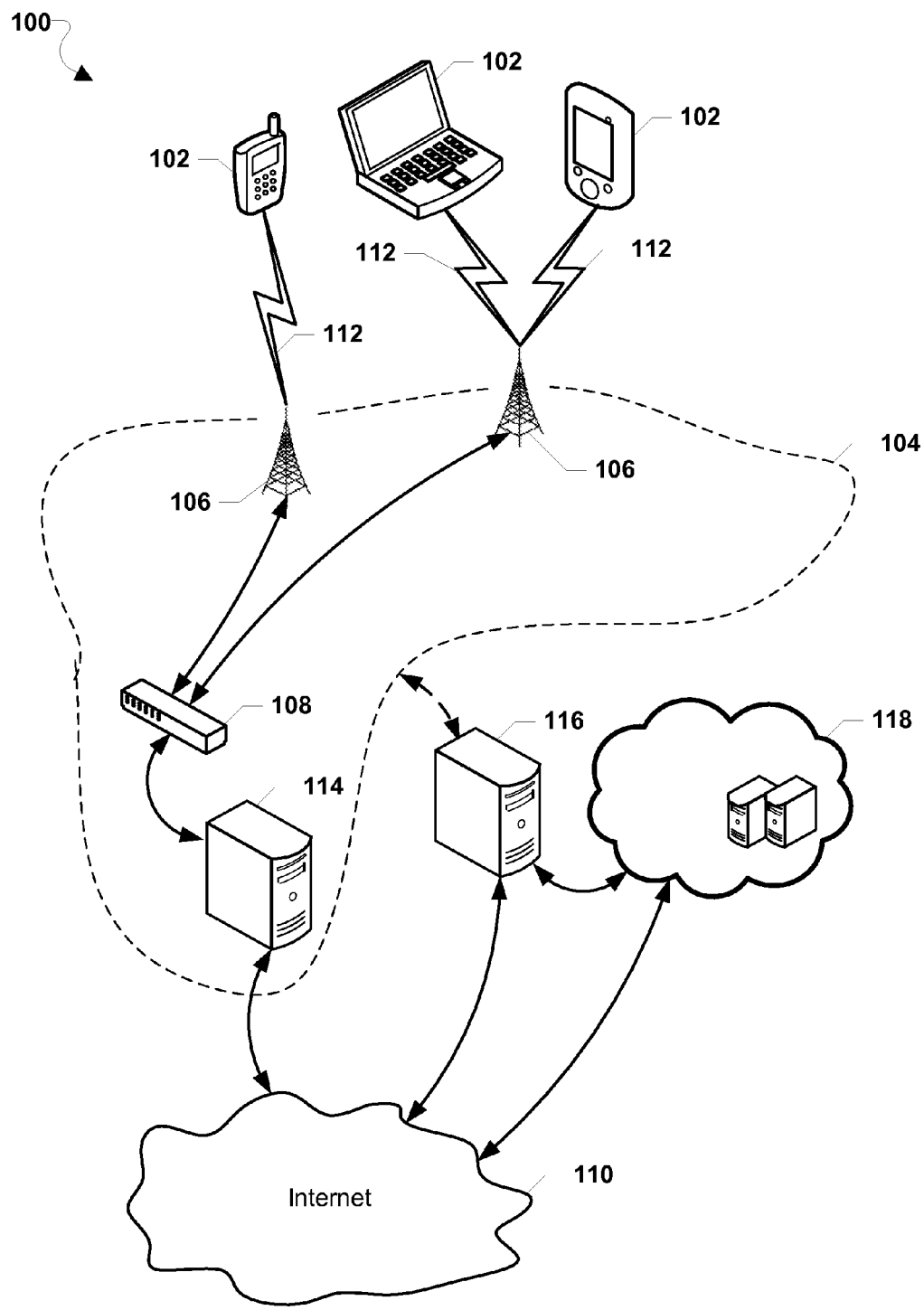
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include servers and mobile computing devices configured to work in conjunction with one another to efficiently identify, classify, model, prevent, and/or correct the conditions and/or mobile computing device behaviors that often degrade a mobile computing device's performance and/or power utilization levels over time. The server, which may be a server in a communication network or a server accessible via the Internet, may be configured to receive information on various capabilities, states, conditions, features, behaviors and corrective actions from a central database (e.g., the "cloud") and/or from many mobile computing devices, and use this information to generate a full classifier model (i.e., a data or behavior model) that describes a large corpus of behavior information in a format or structure (e.g., finite state machine, etc.) that can be quickly converted into one or more lean classifier models. The server may also be configured to receive information from the mobile computing devices that identifies their capabilities, current state and other device-specific information, and use this information to generate lean classifier models that focus on evaluating features that are most important to classifying behaviors on the specific mobile computing device.

In an aspect, the full classifier model may be a finite state machine description or representation of the large corpus of behavior information. In an aspect, the finite state machine may include information that is suitable for expression as a plurality of nodes, boosted decision trees, or decision stumps that each test one or more features. For example, the finite state machine may be an information structure that may be expressed as a family of boosted decision stumps that collectively identify, describe, test, or evaluate all or many of the features and data points that are relevant to determining whether a mobile computing device behavior is benign or contributing to that mobile computing device's degradation in performance over time. The server may then send the full or lean classifier models (i.e., information structures that include the finite state machine and/or family of boosted decision stumps, etc.) to the mobile computing device.

The mobile computing device may be configured to receive and use these classifier models to identify, prevent, and/or correct the conditions, factors, and/or mobile computing device behaviors that contribute to degrading the performance and/or power utilization levels of the mobile computing device over time. The mobile computing device may also use the classifier models to generate even leaner classifier models locally in the mobile computing device. To accomplish this, the mobile computing device may further prune or cull the robust family of boosted decision trees included in the classifier model received from the server to generate a leaner classifier model that includes a reduced number of boosted decision trees and/or evaluates a limited number of test conditions or features. The mobile computing device may then use this classifier models to perform real-time behavior monitoring and analysis operations and identify a source or a cause of an undesirable or performance degrading mobile computing device behavior.

By generating the lean classifier models to account for the capabilities and states of the mobile computing device, the various aspects allow the server to generate focused classifier models that may be used by the mobile computing device to focus its monitoring operations on the features or factors that are most important for identifying the source or cause of an undesirable or performance depredating mobile computing device behavior. This allows the mobile computing device to identify and respond to undesirable or performance degrading mobile computing device behaviors without causing a significant negative or user-perceivable change in the responsiveness, performance, or power consumption characteristics of the mobile computing device.

In addition, by generating classifier models that describe or express a large corpus of behavior information as a finite state machine, decision nodes, decision trees, or other similar information structures that can be modified, culled, augmented, or otherwise used to generate lean classifier models, the various aspects allow a server and/or a mobile computing device to quickly and efficiently generate more focused classifier models.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "mobile computing device" is used herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources, the aspects are generally useful in any electronic device that includes a processor and executes application programs.

The terms "performance degradation" and "malicious behavior" are used herein to refer to a wide variety of undesirable mobile computing device operations and characteristics, such as longer processing times, lower battery life, loss of private data, malicious economic activity (e.g., sending unauthorized premium SMS message), denial of service (DoS), operations relating to commandeering the mobile computing device or utilizing the phone for spying or botnet activities, etc.

Generally, the performance and power efficiency of a mobile computing device degrade over time. Recently, antivirus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile computing device, which may consume many of the mobile computing device's processing and battery resources, slow or render the mobile computing device useless for extended periods of time, and/or otherwise degrade the user experience. In addition, these solutions are typically limited to detecting known viruses and malware, and do not address the multiple complex factors and/or the interactions that often combine to contribute to a mobile computing device's degradation over time (e.g., when the performance degradation is not caused by viruses or malware). For these and other reasons, existing anti-virus, firewall, and encryption products do not provide adequate solutions for identifying the numerous factors that may contribute to a mobile computing device's degradation over time, for preventing mobile computing device degradation, or for efficiently restoring an aging mobile computing device to its original condition.

Mobile computing devices are resource constrained systems that have relatively limited processing, memory, and energy resources. Modern mobile computing devices are also complex systems having a large variety of factors that may contribute to the degradation in performance and power utilization levels of the mobile computing device over time. Examples of factors that may contribute to performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of the complex yet resource-constrained systems of modern mobile computing devices. As such, it is difficult for users, operating systems, or application programs (e.g., anti-virus software, etc.) to accurately and efficiently identify the sources of such problems. As a result, mobile computing device users currently have few remedies for preventing the degradation in performance and power utilization levels of a mobile computing device over time, or for restoring an aging mobile computing device to its original performance and power utilization levels.

Currently, various solutions exist for modeling the behavior of an application program executing on a computing device, and these solutions may be used along with machine learning techniques to determine whether a software application is malicious or benign. However, these solutions are not suitable for use on mobile computing devices because they require evaluating a very large corpus of behavior information, do not generate behavior models dynamically, do not account for capabilities and states of the mobile computing devices, do not intelligently prioritize the features in the behavior model, are limited to evaluating an individual application program or process, and/or require the execution of computationally-intensive processes in the mobile computing device. As such, implementing, performing, or executing these existing solutions in a mobile computing device may have a significant negative and/or user-perceivable impact on the responsiveness, performance, or power consumption characteristics of the mobile computing device.

For example, a computing device may be configured to use an existing machine learning-based solution to access and use a large corpus of training data, derive a model that takes as input a feature vector, and use this model to determine whether a software application of the computing device is malicious or benign. However, such a solution does not generate a full classifier model (i.e., a robust data or behavior model) that describes the large corpus of behavior information in a format or information structure (e.g., finite state machine, etc.) that may be used to generate a lean classifier model. In addition, this solution does not receive identifying information from a mobile computing device that describes the capabilities, functionality, features, configuration, current state, settings, and/or parameters of the device. For at least these reason, such a solution does not allow a server and/or a mobile computing device to quickly and efficiently generate classifier models that include, test, or account for the capabilities and operating states of the mobile computing device. In addition, this solution does not allow a server or a mobile computing device to generate lean classifier models that intelligently identify or prioritize the features in accordance to their relevance to classifying a specific behavior in the specific mobile computing device in which the model is to be used. For these and other reasons, such a solution cannot be used to quickly and efficiently identify, analyze, or classify a complex mobile computing device behavior without having a significant negative or user-perceivable impact on the responsiveness, performance, or power consumption characteristics of the mobile computing device.

In addition to the above-mentioned limitations of existing solutions, many behavior modeling solutions implement a "one-size-fits-all" approach to modeling the behaviors of a computing device, and are therefore not suitable for use in mobile computing devices. That is, these solutions typically generate the behavior models so that they are generic and may be used in many computing devices and/or with a variety of different hardware and software configurations. As such, these generic behavior models often include/test a very large number of features, many of which are not relevant to (and thus cannot be used for) identifying, analyzing, or classifying a behavior in the specific computing device in which they are actually used. In addition, these solutions do not assign relative priorities to features based on their relevance to classifying a specific behavior in the specific mobile computing device in which the model is used. Therefore, these solutions typically require that a computing device apply behavior models that include a large number of disorganized, improperly prioritized, or irrelevant features. Such models are not suitable for use in resource-constrained mobile computing devices because they may cause the mobile computing device processor to analyze a large number of features that are not useful for identifying a cause or source of the mobile computing device's degradation over time. As such, these existing solutions are not suitable for use in complex-yet resource-constrained mobile computing devices.

Modern mobile computing devices are highly configurable and complex systems. As such, the features that are most important for determining whether a particular mobile computing device behavior is benign or not benign (e.g., malicious or performance-degrading) may be different in each mobile computing device. Further, a different combination of features may require monitoring and/or analysis in each mobile computing device in order for that mobile computing device to quickly and efficiently determine whether a particular behavior is benign or not benign. Yet, the precise combination of features that require monitoring and analysis, and the relative priority or importance of each feature or feature combination, can often only be determined using information identifying the capabilities, states, and other device-specific information obtained from the specific mobile computing device in which a behavior is to be monitored or analyzed. For these and other reasons, behavior models generated in any computing device other than the specific device in which they are used typically do not include information that identifies the precise combination of features that are most important to classifying a behavior in that specific device.

To overcome these and other limitations of existing solutions, various aspects may include a comprehensive behavioral monitoring and analysis system for intelligently and efficiently identifying, preventing, and/or correcting the conditions, factors, and/or mobile computing device behaviors that often degrade a mobile computing device's performance and/or power utilization levels over time. By configuring servers and mobile computing devices to work in conjunction with one another and to take into account the capabilities, device states, and other device-specific features, the various aspects allow a mobile computing device to identify and respond to performance degrading mobile computing device behaviors much faster and without consuming an excessive amount of the memory, processing or battery resources of the mobile computing device.

In the various aspects, a server may be configured to receive identifying information from a mobile computing device (i.e., information describing the capabilities, functionality, features, configuration, current state, settings, and/or parameters of the device), such as in the form of a request for download of a behavior classifier model. The server may also receive information on various conditions, features, behaviors and corrective actions from a central database in the form of a large corpus of behavior information (e.g., "cloud data"), and may train such cloud data based on the received identifying information to produce a device-specific lean classifier that includes the features that are specifically relevant to that mobile computing device and that device's current state. The mobile computing device may then use the lean classifier model to perform real-time behavior monitoring and analysis operations and to quickly identify a source or a cause of an undesirable or performance degrading mobile computing device behavior.

Various aspects may enhance overall security and performance on the mobile computing device by leveraging the superior computing power and resources of the server to generate a device-specific lean classifier model that the device may use to monitor features, states, resources, and functionality that are currently present on the device for malicious behavior, thereby enabling the device to focus its monitoring operations on the features or factors that are most important for identifying the source or cause of an undesirable or performance depredating mobile computing device behavior.

In an aspect, an observer process, daemon, module, or sub-system (herein collectively referred to as a "module" or "unit") operating on the mobile computing device may instrument or coordinate various application programming interfaces (APIs), registers, counters or other components (herein collectively "instrumented components") at various levels of the mobile computing device system. The observer module may continuously (or near continuously) monitor mobile computing device behaviors by collecting behavior information from the instrumented components. The mobile computing device may also include a behavior analyzer unit, and the observer module may communicate (e.g., via a memory write operation, function call, etc.) the collected behavior information to the behavior analyzer unit. The behavior analyzer unit may receive and use the behavior information to generate behavior vectors, generate spatial and/or temporal correlations based on the behavior vectors, and use this information to determine whether a particular mobile computing device behavior, condition, sub-system, software application, or process is benign, suspicious, or not benign (i.e., malicious or performance-degrading). The mobile computing device may then use the results of this analysis to heal, cure, isolate, or otherwise fix or respond to identified problems.

The behavior analyzer unit may also be configured to perform real-time behavior analysis operations, which may include performing, executing, and/or applying data, algorithms, classifiers or models (herein collectively referred to as "classifier models") to the collected behavior information to determine whether a mobile computing device behavior is benign or malicious or performance-degrading. Each classifier model may be a behavior model that includes data and/or information structures (e.g., feature vectors, behavior vectors, component lists, etc.) that may be used by a mobile computing device processor to evaluate a specific feature or aspect of a mobile computing device's behavior. Each classifier model may also include decision criteria for monitoring a number of features, factors, data points, entries, APIs, states, conditions, behaviors, applications, processes, operations, components, etc. (herein collectively "features") in the mobile computing device. The classifier models may be preinstalled on the mobile computing device, downloaded or received from a server, or any combination thereof. The classifier models may be generated on a server by using crowd sourcing solutions, behavior modeling techniques, machine learning algorithms, etc. as further described below.

A classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes only the features/entries that are most relevant for determining whether a particular mobile computing device behavior is benign or not benign (e.g., malicious or performance-degrading).

In an aspect, receiving a classifier model may include receiving an XML, JSON, YAML, HTML/XHTML, or other markup language file. That is, a classifier model may be included or defined in an XML, JSON, YAML, HTML/XHTML, or other markup language file that identifies factors and data points most relevant to enabling the mobile computing device processor to better determine whether a mobile computing device behavior is benign or malicious. In an aspect, a classifier model may be a processor executable software application that identifies factors and data points most relevant to enabling the mobile computing device processor to better determine whether a mobile computing device behavior is benign or malicious. In an aspect, a classifier model may include a mapping of features to behavior classifications or behavior vectors.

As mentioned above, because mobile computing devices are resource constrained systems, it is often not feasible for the mobile computing device to evaluate all of the features included in a full classifier model. Further, mobile computing devices come in many different configurations and varieties, but few (if any) include every feature or functionality that may be addressed in full classifier models. Thus, in various aspects, in response to receiving identifying information from a particular mobile computing device, the server may use behavior modeling and machine learning techniques to intelligently and dynamically generate the lean classifier models so that they account for capabilities, states, and other device-specific features of that mobile computing device (e.g., features relevant to the mobile computing device configuration, functionality, current state, connected/included hardware, etc.), include a focused and targeted subset of the features that are determined to be important for identifying a cause or source of the mobile computing device's degradation over time, and/or prioritize the targeted subset of features based on probability or confidence values identifying their relative importance for successfully classifying a behavior in the specific mobile computing device in which they are used/evaluated.

In other words, the identifying information received from the mobile computing device may include capability and state information that may be used by the server to quickly identify and prioritize the features that should be included in a device-specific lean classifier model for that device, as well as to identify the features that should be excluded from such device-specific lean classifier models. For example, the server may be configured to identify and exclude from the lean classifier models the features/nodes/stumps included in the full classifier model that test conditions that do not or cannot exist in the mobile computing device based on its specific capabilities, feature set, and/or current state of operation, and therefore are not relevant to the mobile computing device. For example, a mobile computing device that does not include a biometric sensor may not benefit from lean classifier models that include features/nodes/stumps that test or evaluate conditions relating to the use of a biometric sensor. These aspects also allow the server to accurately prioritize these features in the lean classifier models sent to the mobile computing device in accordance with their relative importance to classifying behaviors in that specific mobile computing device.

Thus, since the device-specific lean classifier models include reduced subsets of states, features, behaviors, or conditions that should be evaluated (compared to a full classifier model) to account for the capabilities and states of that specific mobile computing device, the observer and/or behavior analyzer units operating on a mobile computing device may use the lean classifier model to focus their operations on the most important features, and to quickly and accurately determine whether a mobile computing device behavior is benign or not benign (e.g., malicious or performance-degrading) without consuming an excessive amount of processing, memory, or energy resources of the mobile computing device.

In an aspect, the server may be configured to use a full classifier model to generate a family of lean classifier models of varying levels of complexity (or "leanness") for use on the mobile computing device. The leanest family of lean classifier models (i.e., the lean classifier model based on the fewest number of test conditions) may be applied routinely until a behavior is encountered that the model cannot categorize as either benign or malicious (and therefore is categorized by the model as suspicious), at which time a more robust (i.e., a less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or behavior analyzer units can strike a balance between efficiency and accuracy by limiting the use of the most complete, but resource-intensive lean classifier models to those situations where a robust classifier model is needed to definitively classify a behavior.

In an aspect, the server may generate lean classifier models to include a finite state machine expression or representation, such as a boosted decision stump or family of boosted decision stumps that are suitable for use or execution in a mobile computing device processor. The finite state machine expression or representation may be an information structure that includes test conditions, state information, state-transition rules, and other similar information. In an aspect, the finite state machine expression or representation may be an information structure that includes a large or robust family of boosted decision stumps that each evaluate or test a feature, condition, or aspect of a mobile computing device behavior.

In an aspect, the mobile computing device may utilize lean classifier models in the form of a set of boosted decision stumps based on the mobile computing device's specific states, features, behaviors, conditions, or configurations and may use the set of boosted decision stumps to intelligently monitor, analyze and/or classify a mobile computing device behavior. Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions). Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the mobile computing device).

In another aspect, a server processor executing a model generator unit may store lean classifier models in a database and may associate the models with the set of features used to create the models and/or the mobile computing devices that have received the lean classifier models. Thus, rather than repeatedly generating the same classifier model for the same types of mobile computing devices (i.e., devices that share the same features), the server processor executing the model generator unit may send a stored/cached lean classifier model to a mobile computing device requesting a classifier model in response to determining that the mobile computing device has a set of features that matches the features represented in the stored model. In another aspect, the server processor executing the model generator unit may periodically update stored lean classifier models to incorporate new or changed behavior data in the cloud data set.

In another aspect, a device-state monitoring engine operating on the mobile computing device may look for configuration and/or state changes that may impact the performance or effectiveness of the behavior analyzer unit (or a classifier module) to detect malicious behavior. The device-state monitoring engine may also notify a state-specific feature generator operating on the mobile computing device when the device-state monitoring engine detects a state change, and the state-specific feature generator may signal the behavior analyzer unit to request an updated lean classifier model from the server based on the device's state change.

In another aspect, a device-feature monitoring engine operating on the mobile computing device may continually monitor for changes in the mobile computing device's functionality or capabilities (e.g., the addition or loss of capabilities associated with a peripheral device when the peripheral device is connected or disconnected). In response to detecting a functionality/capability change, the device-feature monitoring engine may notify a feature generator operating on the mobile computing device, and the feature generator may signal the behavior analyzer unit to request an updated lean classifier model from the server based on the device's change in functionalities/capabilities.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile computing devices 102 (e.g., cell phones, laptops, tablets, etc.) and other network destinations, such as via telephone land lines (e.g., a POTS network, not shown) and the Internet 110. Communications between the mobile computing devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include servers 116 connected to the telephone network 104 and to the Internet 110. The connection between the server 116 and the telephone network 104 may be through the Internet 110 or through a private network (as illustrated by the dashed arrows). The server 116 may also be implemented as a server within the network infrastructure of a cloud service provider network 118. Communication between the server 116 and the mobile computing devices 102 may be achieved through the telephone network 104, the internet 110, private network (not illustrated), or any combination thereof.

The server 116 may send a reduced set of behavior models/lean classifier models to the mobile computing device 102, and the mobile computing device 102 may use the lean classifier models to identify suspicious or performance-degrading mobile computing device behaviors, software applications, processes, etc. The server 116 may also send classification and modeling information to the mobile computing devices 102 to replace, update, create and/or maintain mobile computing device data/behavior models.

The mobile computing device 102 may be configured to collect behavioral, state, classification, modeling, success rate, and/or statistical information in the mobile computing device 102, and send the collected information to the server 116 (e.g., via the telephone network 104) for analysis. The server 116 may use information received from the mobile computing device 102 to update or refine large classifier models or the classification/modeling information.

Figure 2:
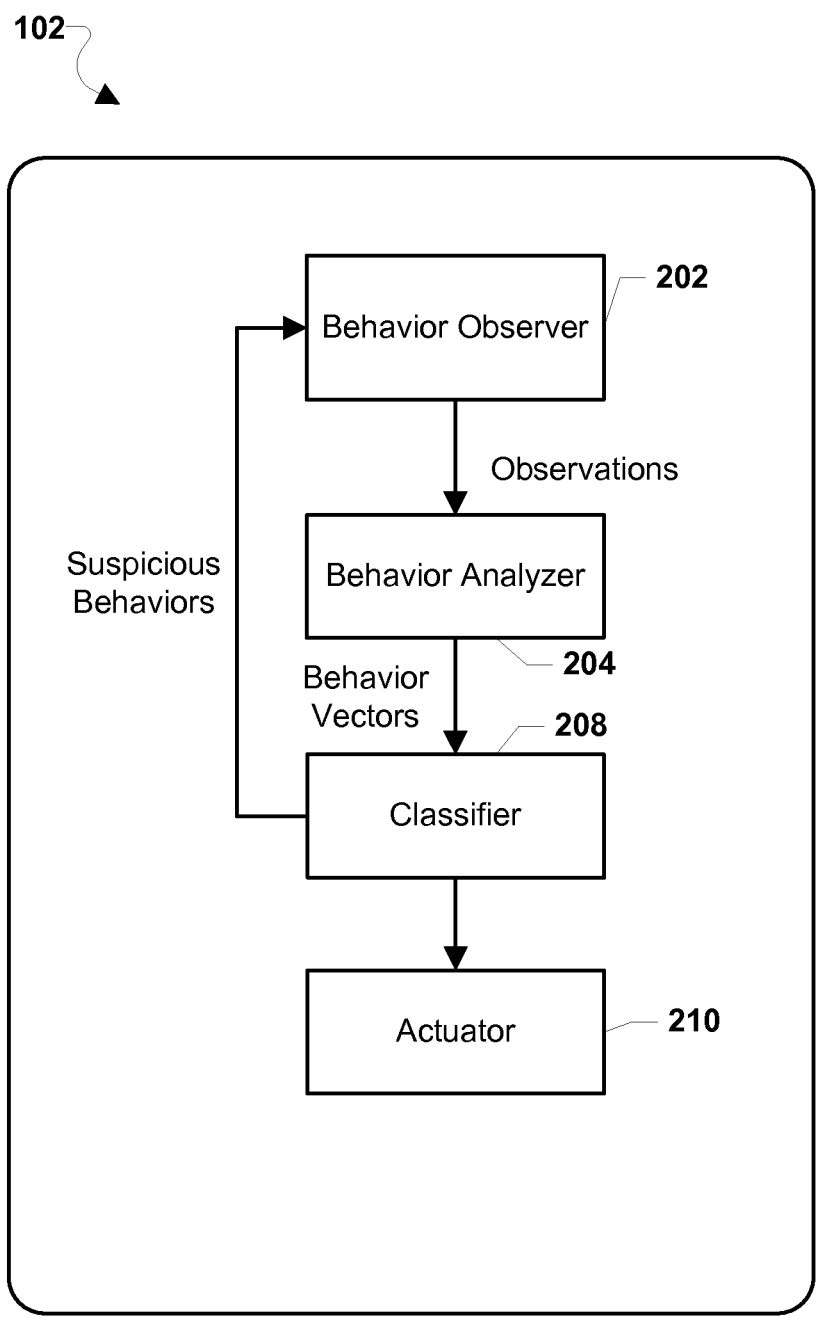
FIG. 2 is a block diagram illustrating example logical components and information flows in an aspect mobile computing device configured to determine whether a particular mobile computing device behavior, software application, or process is malicious, suspicious, or benign.

FIG. 2 illustrates example logical components and information flows in an aspect mobile computing device 102 configured to determine whether a particular mobile computing device behavior, software application, or process is malicious/performance-degrading, suspicious, or benign. In the example illustrated in FIG. 2, the mobile computing device 102 includes a behavior observer unit 202, a behavior analyzer unit 204, a classifier unit 208, and an actuator unit 210.

In an aspect, the classifier unit 208 may be implemented as part of the behavior analyzer unit 204. In an aspect, the behavior analyzer unit 204 may be configured to generate one or more classifier units 208, each of which may include one or more classifiers.

Each of the units 202-210 may be implemented in software, hardware, or any combination thereof. In various aspects, the units 202-210 may be implemented within parts of the operating system (e.g., within the kernel, in the kernel space, in the user space, etc.), within separate programs or applications, in specialized hardware buffers or processors, or any combination thereof. In an aspect, one or more of the units 202-210 may be implemented as software instructions executing on one or more processors of the mobile computing device 102.

The behavior observer unit 202 may be configured to instrument or coordinate application programming interfaces (APIs) at various levels/units of the mobile computing device, and monitor/observe mobile computing device operations and events (e.g., system events, state changes, etc.) at the various levels/units via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer unit 204.

The behavior observer unit 202 may monitor/observe mobile computing device operations and events by collecting information pertaining to library API calls in an application framework or run-time libraries, system call APIs, file-system and networking sub-system operations, device (including sensor devices) state changes, and other similar events. The behavior observer unit 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer unit 202 may also monitor data network activity, which may include types of connections, protocols, port numbers, server/client that the device is connected to, the number of connections, volume or frequency of communications, etc. The behavior observer unit 202 may monitor phone network activity, which may include monitoring the type and number of calls or messages (e.g., SMS, etc.) sent out, received, or intercepted (e.g., the number of premium calls placed).

The behavior observer unit 202 may also monitor the system resource usage, which may include monitoring the number of forks, memory access operations, number of files open, etc. The behavior observer unit 202 may monitor the state of the mobile computing device, which may include monitoring various factors, such as whether the display is on or off, whether the device is locked or unlocked, the amount of battery remaining, the state of the camera, etc. The behavior observer unit 202 may also monitor inter-process communications (IPC) by, for example, monitoring intents to crucial services (browser, contracts provider, etc.), the degree of inter-process communications, pop-up windows, etc.

The behavior observer unit 202 may also monitor/observe driver statistics and/or the status of one or more hardware components, which may include cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer unit 202 may also monitor/observe one or more hardware counters that denote the state or status of the mobile computing device and/or mobile computing device sub-systems. A hardware counter may include a special-purpose register of the processors/cores that is configured to store a count or state of hardware-related activities or events occurring in the mobile computing device.

The behavior observer unit 202 may also monitor/observe actions or operations of software applications, software downloads from an application download server (e.g., Apple® App Store server), mobile computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, Wi-Fi, etc.), content of text-based communications, content of recorded audio files, phonebook or contact information, contacts lists, etc.

The behavior observer unit 202 may monitor/observe transmissions or communications of the mobile computing device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer unit 202 may monitor/observe usage of and updates/changes to compass information, mobile computing device settings, battery life, gyroscope information, pressure sensors, magnet sensors, screen activity, etc. The behavior observer unit 202 may monitor/observe notifications communicated to and from a software application (AppNotifications), application updates, etc. The behavior observer unit 202 may monitor/observe conditions or events pertaining to a first software application requesting the downloading and/or install of a second software application. The behavior observer unit 202 may monitor/observe conditions or events pertaining to user verification, such as the entry of a password, etc.

The behavior observer unit 202 may also monitor/observe conditions or events at multiple levels of the mobile computing device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile computing device before establishing radio communication links or transmitting information, dual/multiple subscriber identity module (SIM) cards, Internet radio, mobile phone tethering, offloading data for computations, device state communications, the use as a game controller or home controller, vehicle communications, mobile computing device synchronization, etc. Radio level observations may also include monitoring the use of radios (WiFi, WiMax, Bluetooth®, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device. For example, the mobile computing device processor may be configured to determine whether the phone is in a holster (e.g., via a magnet sensor configured to sense a magnet within the holster) or in the user's pocket (e.g., via the amount of light detected by a camera or light sensor). Detecting that the mobile computing device is in a holster may be relevant to recognizing suspicious behaviors, for example, because activities and functions related to active usage by a user (e.g., taking photographs or videos, sending messages, conducting a voice call, recording sounds, etc.) occurring while the mobile computing device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a universal serial bus (USB) power charging source, detecting that a keyboard or auxiliary device has been coupled to the mobile computing device, detecting that the mobile computing device has been coupled to a mobile computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device, etc.

To reduce the number of factors monitored to a manageable level, in an aspect, the behavior observer unit 202 may perform coarse observations by monitoring/observing an initial set of behaviors or features that are a small subset of all features that could contribute to the mobile computing device's degradation. In an aspect, the behavior observer unit 202 may receive the set of behaviors and/or features from a behavior analyzer unit 204 and/or a server 116 and/or a component in a cloud service or network 118. In an aspect, the behavior analyzer unit 204 may send behaviors/features to the behavior observer unit 202 in the form of a device-specific lean classifier model that includes behaviors for features specific to the mobile computing device 102 or to the current state of the mobile computing device 102. The behavior analyzer unit 204 may receive the lean classifier model from the server (e.g., server 116) as described below with reference to FIG. 3.

The behavior analyzer unit 204 and/or classifier unit 208 may receive the observations from the behavior observer unit 202, compare the received information (i.e., observations) with contextual information received from the external modules (e.g., context information unit 206), and identify subsystems, processes, and/or applications associated with the received observations that are contributing to (or are likely to contribute to) the device's degradation over time, or which may otherwise cause problems on the device.

In an aspect, the behavior analyzer unit 204 and/or classifier unit 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer unit 204 may be configured to analyze information (e.g., in the form of observations) collected from various units (e.g., the behavior observer unit 202, external modules, etc.), learn the normal operational behaviors of the mobile computing device, and generate one or more behavior vectors based the results of the comparisons. The behavior analyzer unit 204 may send the generated behavior vectors to the classifier unit 208 for further analysis.

The classifier unit 208 may receive the behavior vectors and compare them to one or more behavior modules to determine whether a particular mobile computing device behavior, software application, or process is performance-degrading/malicious, benign, or suspicious.

When the classifier unit 208 determines that a behavior, software application, or process is malicious or performance-degrading, the classifier unit 208 may notify the actuator unit 210, which may perform various actions or operations to correct mobile computing device behaviors determined to be malicious or performance-degrading and/or perform operations to heal, cure, isolate, or otherwise fix the identified problem.

When the classifier unit 208 determines that a behavior, software application, or process is suspicious, the classifier unit 208 may notify the behavior observer unit 202, which may adjust the granularity of its observations (i.e., the level of detail at which mobile computing device behaviors are observed) and/or change the behaviors/features that are observed based on information received from the classifier unit 208 (e.g., results of the real-time analysis operations), generate or collect new or additional behavior information, and send the new/additional information to the behavior analyzer unit 204 and/or classifier unit 208 for further analysis/classification. Such feedback communications between the behavior observer unit 202 and the classifier unit 208 enable the mobile computing device 102 to recursively increase the granularity of the observations (i.e., make finer or more detailed observations) or change the features/behaviors that are observed until a source of a suspicious or performance-degrading mobile computing device behavior is identified, until a processing or battery consumption threshold is reached, or until the mobile computing device processor determines that the source of the suspicious or performance-degrading mobile computing device behavior cannot be identified from further increases in observation granularity. Such feedback communication also enable the mobile computing device 102 to adjust or modify the data/behavior models locally in the mobile computing device without consuming an excessive amount of the mobile computing device's processing, memory, or energy resources.

In an aspect, the behavior observer unit 202 and the behavior analyzer unit 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer unit 202 enables the mobile computing device 102 to efficiently identify and prevent problems from occurring on mobile computing devices without requiring a large amount of processor, memory, or battery resources on the device.

In various aspects, the behavior observer unit 202 and/or the behavior analyzer unit 204 may be configured to analyze mobile computing device behaviors by identifying a critical data resource that requires close monitoring, identifying an intermediate resource associated with the critical data resource, monitoring API calls made by a software application when accessing the critical data resource and the intermediate resource, identifying mobile computing device resources that are consumed or produced by the API calls, identifying a pattern of API calls as being indicative of malicious activity by the software application, generating a light-weight behavior signature based on the identified pattern of API calls and the identified mobile computing device resources, using the light-weight behavior signature to perform behavior analysis operations, and determining whether the software application is malicious or benign based on the behavior analysis operations.

In various aspects, the behavior observer unit 202 and/or the behavior analyzer unit 204 may be configured to analyze mobile computing device behaviors by identifying APIs that are used most frequently by software applications executing on the mobile computing device, storing information regarding usage of identified hot APIs in an API log in a memory of the mobile computing device, and performing behavior analysis operations based on the information stored in the API log to identify mobile computing device behaviors that are inconsistent with normal operation patterns. In an aspect, the API log may be generated so that it is organized such that that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various aspects, the behavior observer unit 202 and/or the behavior analyzer unit 204 may be configured to analyze mobile computing device behaviors by receiving a full classifier model that includes a finite state machine that is suitable for conversion or expression as a plurality of boosted decision stumps, generating a lean classifier model in the mobile computing device based on the full classifier, and using the lean classifier model in the mobile computing device to classify a behavior of the mobile computing device as being either benign or not benign (i.e., malicious, performance degrading, etc.). In an aspect, generating the lean classifier model based on the full classifier model may include determining a number of unique test conditions that should be evaluated to classify a mobile computing device behavior without consuming an excessive amount of processing, memory, or energy resources of the mobile computing device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In various aspects, the behavior observer unit 202 and/or the behavior analyzer unit 204 may be configured to use device-specific information, such as capability and state information, of the mobile computing device to identify mobile computing device-specific test conditions in a plurality of test conditions that are relevant to classifying a behavior of the mobile computing device, generate a lean classifier model that includes only the identified mobile computing device-specific test conditions, and use the generated lean classifier model in the mobile computing device to classify the behavior of the mobile computing device. In an aspect, the lean classifier model may be generated to include only decision nodes that evaluate a mobile computing device feature that is relevant to a current operating state or configuration of the mobile computing device. In a further aspect, generating the lean classifier model may include determining a number of unique test conditions that should be evaluated to classify the behavior without consuming an excessive amount of mobile computing device's resources (e.g., processing, memory, or energy resources), generating a list of test conditions by sequentially traversing the plurality of test conditions in the full classifier model, inserting those test conditions that are relevant to classifying the behavior of the mobile computing device into the list of test conditions until the list of test conditions includes the determined number of unique test conditions, and generating the lean classifier model to include decision nodes included in the full classifier model that test one of the conditions included in the generated list of test conditions.

In various aspects, the behavior observer unit 202 and/or the behavior analyzer unit 204 may be configured to recognize mobile computing device behaviors that are inconsistent with normal operation patterns of the mobile computing device by monitoring an activity of a software application or process, determining an operating system execution state of the software application/process, and determining whether the activity is benign based on the activity and/or the operating system execution state of the software application or process during which the activity was monitored. In an further aspect, the behavior observer unit 202 and/or the behavior analyzer unit 204 may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is benign, suspicious, or not benign (i.e., malicious or performance-degrading).

Figure 3:
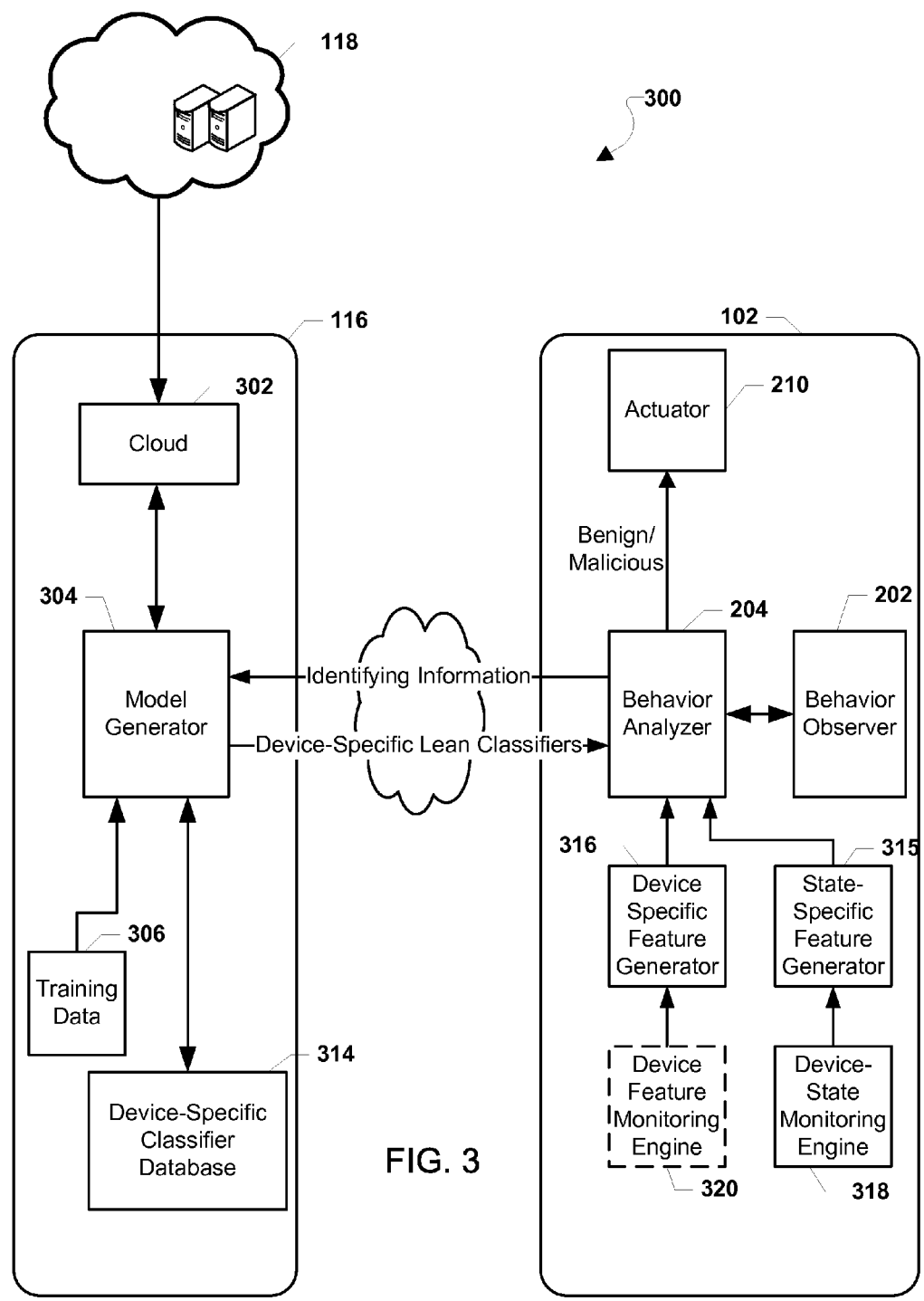
FIG. 3 is a block diagram illustrating example components and information flows in an aspect system including a server and a mobile computing device according to an aspect.

FIG. 3 illustrates example components and information flows in an aspect system 300 that includes a mobile computing device 102 configured to work in conjunction with a server 116 to intelligently and efficiently identify actively malicious or poorly written software applications and/or suspicious or performance-degrading mobile computing device behaviors on the mobile computing device 102 without consuming an excessive amount of processing, memory, or energy resources of the mobile computing device.

In the example illustrated in FIG. 3, the server 116 may include a cloud unit 302, a model generator unit 304, a training data unit 306, and a device-specific classifier database 314. The mobile computing device 102 may include a behavior observer unit 202, a behavior analyzer unit 204, and an actuator unit 210 as illustrated in FIG. 2. In an aspect, the behavior analyzer unit 204 may include the classifier unit 208. The mobile computing device 102 may also include a state-specific feature generator 315, a device-state monitoring engine 318, a device-specific feature generator 316 and, optionally, a device-feature monitoring engine 320. In another aspect, the state-specific feature generator 315, the device-state monitoring engine 318, the device-specific feature generator 316 and/or device-feature monitoring engine 320 may be implemented as part of the behavior analyzer unit 204.

The cloud unit 302 may be configured to receive a large amount of information from a cloud service/network 118 that includes all or most of the features, data points, and/or factors that could contribute to a mobile computing device's degradation over time (collectively referred to herein as a "cloud data set"). In an aspect, the cloud service/network 118 may receive such information from a plurality of mobile computing devices (e.g., a large number of mobile computing devices).

In various aspects, the model generator unit 304 may generate a full classifier model by performing, executing, and/or applying machine learning and/or context modeling techniques to behavior information and/or the results of behavior analyses provided by a large number of mobile computing devices or other information received from the cloud service/network 118 via the cloud unit 302. Thus, the model generator unit 304 may receive a large number of reports from many mobile computing devices and analyze, consolidate or otherwise turn such crowd-sourced information into useable information, particularly behavior models that may be used or accessed by all mobile computing devices. The model generator unit 304 may continuously reevaluate existing behavior models as new behavior/analysis reports are received from mobile computing devices, and/or generate new or updated behavior models based on historical information (e.g., collected from prior executions, previous applications of behavior models, etc.), new information, machine learning, context modeling, and detected changes in the available information, mobile computing device states, environmental conditions, network conditions, mobile computing device performance, battery consumption levels, etc.

In an aspect, the model generator unit 304 may generate the full classifier model to include a finite state machine representation, such as a boosted decision stump or family of boosted decision stumps that can be quickly and efficiently culled, modified or converted into lean classifier models that are suitable for use or execution in a mobile computing device processor. The finite state machine expression or representation may be an information structure that includes test conditions, state information, state-transition rules, and other similar information. In an aspect, the finite state machine expression or representation may be an information structure that includes a large or robust family of boosted decision stumps that each evaluate or test a condition, feature, factor, or aspect of a behavior of the mobile computing device.

As noted above, different mobile computing devices may include various different capabilities and behaviors that depend on the mobile computing devices' particular device-specific features, which may include various wireless communication systems/radios, haptic interfaces, connectivity services (e.g., near-field communications or "NFC"), identity management interfaces (e.g., facial recognition and fingerprint recognition), etc. Given the diversity of mobile computing device capabilities, the features that one mobile computing device may need to monitor for malicious behavior may differ from the features that are important or relevant to other mobile computing devices. If a mobile computing device receives a classifier model that includes irrelevant features (i.e., features not on the mobile computing device) or does not address features that are present on the device, monitoring for malicious and suspicious behaviors may be compromised.

Further, a mobile computing device may include features and capabilities that depend on the device's particular state or states. For example, while a mobile computing device may include Bluetooth® capabilities, the user may have currently turned those capabilities off to save battery power. Thus, the mobile computing device may not have any use for classifier models that include features related to Bluetooth® while the device is in a state in which its Bluetooth® capabilities are turned off. In another aspect, the mobile computing device's state may affect the device's capacity to use classifier models (e.g., a "low" battery state) or may affect the importance of certain features (e.g., network security features when the device is connected to an unsecure network).

To ensure that the mobile computing device 102 receives a relevant, device-specific lean classifier model from the server 116 that sufficiently addresses the device's capabilities, states, device-specific features and/or state-specific features, the device 102 may send identifying information to the server 116 (as illustrated in FIG. 3) to inform the server 116 of its capabilities, states, device-specific and state-specific features, thereby enabling the server 116 to generate a customized behavior classifier model (i.e., a device-specific lean classifier model) that is pertinent to all of the mobile computing device's features and the device's current state and does not include classifiers for features not in the device or irrelevant to the device's current state.

In an aspect, the device-specific feature generator 316 and/or the behavior analyzer unit 204 operating on the mobile computing device 102 may generate device-specific information (e.g., a serial number, manufacturer number, version, model number/type, etc.) that the server 116 may use to identity the capabilities, states, and device-specific features of the device 102. For example, the device-specific feature generator 316 may generate device-specific information that identifies the mobile computing device 102 as an Apple iPhone 5S® that includes 32 gigabytes of storage configured for the Verizon Wireless networks, and this device-specific information may be sufficient to enable the server 116 to identify all of the modules, features, capabilities, and functionalities on the device.

In another aspect, the device-specific feature generator 316 may determine a set of device-specific features included on and/or relevant to the mobile computing device 102, and the behavior analyzer unit 204 may includes these features in the identifying information sent to the model generator unit 304. For example, the device-specific feature generator 316 may recognize the presence of a Bluetooth® radio, among other things, on the mobile computing device 102, and the behavior analyzer unit 204 may include features related to Bluetooth® in the identifying information sent to the server 116, thereby ensuring that the device-specific classifier model received from the server 116 will enable the mobile computing device 102 to detect malicious behavior involving the Bluetooth® radio.

In a further aspect, the device-specific feature generator 316 may also recognize features available to the mobile computing device 102 via peripheral devices (e.g., wireless user interface devices, controllers, video-out devices, etc.), and the device-specific feature generator 316 and/or the behavior analyzer unit 204 may include those features or information regarding those peripheral devices in the identifying information sent to the model generator unit 304.

Similarly, in another aspect, the state-specific feature generator 315 may identify the current state/configuration of mobile computing device 102 and/or the features related to the current state/configuration of the device 102. The state-specific feature generator 315 and/or the behavior analyzer unit 204 may include such state-specific information in the identifying information sent to the server 116, thereby ensuring that the device-specific lean classifier received from the server 116 includes features relevant to the current state of the device 102.

After generating the identifying information, the behavior analyzer unit 204 may send the information to the model generator unit 304 operating on the server 116 as illustrated in FIG. 3. In an aspect, the behavior analyzer unit 204 may send the identifying information as part of or as an extension of an application programming interface (API) that is used to establish communications between the mobile computing device 102 and the server 116.

In response to receiving identifying information from the mobile computing device 102, the model generator unit 304 may determine the set of device-specific features and state-specific features that should be included in a device-specific lean classifier model to be sent to the mobile computing device 102. For instance, when the identifying information includes the mobile computing device 102's type, version, or model number, the model generator unit 304 may access a device-specific classifier database 314 to determine the set of features stored in the database 314 that is associated with the mobile computing device's 102 type or model. For example, the model generator unit 304 may recognize that the identifying information of the mobile computing device 102 includes a model ID number for an iPhone 5S®, and the model generator unit 304 may reference the device-specific classifier database 314 to determine the set of features that are associated with an iPhone 5S®.

In another aspect, the model generator unit 304 may determine the features relevant to the mobile computing device based on the device's identifying information itself without referencing the device-specific classifier database 314. In other words, the identifying information sent from the behavior analyzer unit 204 may explicitly list device-specific and/or state-specific features currently present on the device. Determining a mobile computing device's device-specific and state-specific features is further described below with reference to FIG. 6.

After determining the set of device-specific and state-specific features present on the mobile computing device 102, the model generator unit 304 may retrieve a cloud data set from the cloud unit 302 and perform full machine learning training algorithms on the cloud data set in view of the set of device-specific and state-specific features determined to be present on the mobile computing device 102. In other words, the model generator unit 304 may train the cloud data set to generate a set of classifiers for the mobile computing device 102's specific features (i.e., a device-specific lean classifier model). In an aspect, the model generator unit 304 may generate the device-specific lean classifier models based on larger and more complicated behavior models (i.e., full classifier models) received from a cloud service or developed based on the cloud data set as described above. The model generator unit 304 may send the generated device-specific lean classifier model to the mobile computing device 102, and the behavior observer unit 202 and behavior analyzer unit 204 may begin using the device-specific model to monitor for malicious behavior as described above with reference to FIG. 2.

In another aspect, the model generator unit 304 may be configured to cull a family of boosted decision stumps included in the full classifier model to generate a device-specific lean classifier model that includes a reduced number of boosted decision stumps and/or evaluates a limited number of test conditions that are relevant to the device-specific and state-specific features of the mobile computing device 102. This culling of the full boosted decision stumps classifier model may be accomplished by: selecting a boosted decision stump; identifying all other boosted decision stumps that depend upon the same mobile computing device-specific and/or state-specific feature, behavior, or condition as the selected decision stump (and thus can be applied based upon one determination result); including in the lean classifier model the selected and all identified other boosted decision stumps that depend upon the same mobile computing device-specific and/or state-specific feature, behavior, or condition; and repeating the process for a limited number of selected boosted decision stumps not already included in the lean classifier model. In this manner, the model generator unit 304 may generate a device-specific lean classifier model that includes all boosted decision stumps that depend upon a limited number of different mobile computing device-specific and/or state-specific features, behaviors, or conditions that are relevant to the computing device 102.

In another aspect, the model generator unit 304 may store the device-specific lean classifier model generated for the mobile computing device 102 in the device-specific classifier database 314 correlated to the device-specific features and the state-specific features used to generate that lean classifier model and/or with the mobile computing device for which the lean classifier model was generated. The next time that a request is received for a device-specific lean classifier model from that mobile computing device, the model generator unit 304 may perform a database lookup in the device-specific classifier database 314 using the requesting mobile computing device's identifying information to obtain the stored classifier model suitable for that mobile computing device. If the model generator unit 304 finds that there is no stored classifier model in the database that is suitable for the requesting mobile computing device, it may generate a new device-specific lean classifier model as described above. Thus, by storing generated device-specific lean classifier models, the model generator unit 304 may avoid having to repeatedly generate a device-specific lean classifier models from scratch.

In another aspect, the device-state monitoring engine 318 may continually monitor for configuration and/or state changes on the mobile computing device 102. These configuration and/or state changes may relate to various features or components of the mobile computing device 102. For example, the device-state monitoring engine 318 may detect when the mobile computing device 102 connects to a new wireless network, when the mobile computing device 102's battery level drops below a threshold (e.g., a low-battery state), when the mobile computing device 102 is roaming, and when the mobile computing device establishes a Bluetooth® connection with a wireless peripheral device (e.g., a wireless keyboard or gaming controller). In a further aspect, the device-state monitoring engine may only monitor for significant changes/events on the mobile computing device 102 (e.g., enabling "Airplane Mode" on the mobile computing device 102).

After detecting a configuration and/or state change, the device-state monitoring engine 318 may notify the state-specific feature generator 315. The state-specific feature generator 315 may identity one or more features related to the configuration and/or state change and may send a signal to the behavior analyzer unit 204 to request an updated device-specific lean classifier model from the server 116 that reflects that change. For example, when the device-state monitoring engine 318 informs the state-specific feature generator 315 that the mobile computing device 102 has turned off its cellular network communication capabilities, the state-specific feature generator 315 may determine that features related to the mobile computing device's cellular network/transceiver should not be included in the identifying information, thereby enhancing the model generator unit 304's overall ability to generate a device-specific lean classifier that only includes features relevant to the mobile computing device 102's current state.

In another aspect, the device-feature monitoring engine 320 may monitor for changes in the functionality/capabilities of the mobile computing device. For example, the device-feature monitoring engine 320 may detect that a new peripheral device has been installed on the mobile computing device, thereby giving the mobile computing device 102 new/changed functionality and additional features. Similarly, the device-feature monitoring engine 320 may detect when the mobile computing device 102 loses some functionality (e.g., a feature is disabled or uninstalled). The device-feature monitoring engine 320 may alert the device-specific feature generator 316 of the change in the mobile computing device 102's functionality in response to detecting a new or removed capability. The device-specific feature generator 316 may determine the features that are associated with the change in functionality and may signal the behavior analyzer unit 204 to request an updated device-specific lean classifier model from the server 116 as further described below with reference to FIG. 5A.

Figure 4:
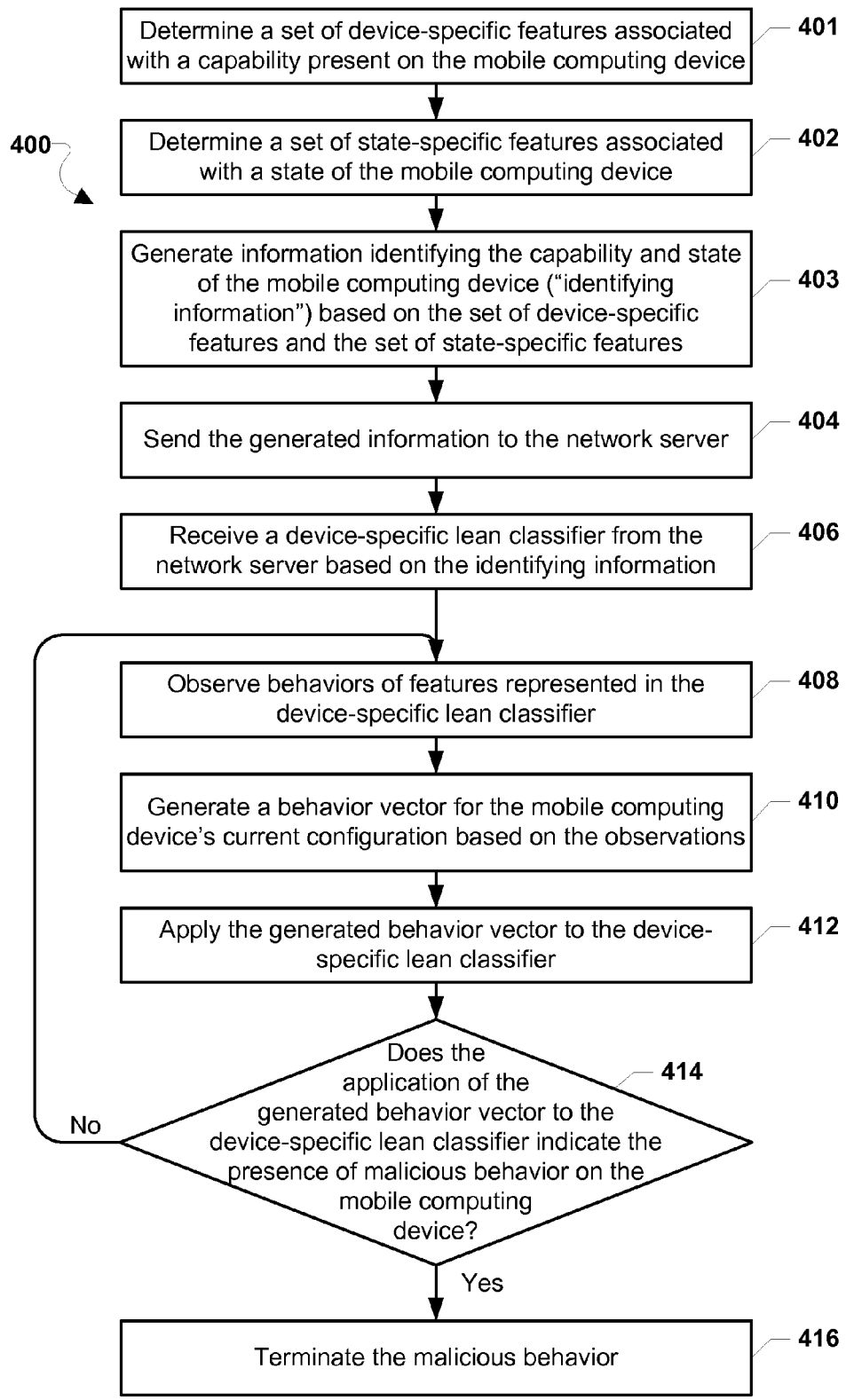
FIG. 4 is a process flow diagram illustrating an aspect method for requesting a device-specific lean classifier model from a server and utilizing the device-specific lean classifier model to classify mobile computing device behavior as benign or malicious.

FIG. 4 illustrates an aspect method 400 that may be implemented by a processor executing on a mobile computing device for requesting a lean classifier model from a server for use in classifying mobile computing device behavior as benign or malicious. To ensure that the received classifier model includes features or other information that will enable the mobile computing device to monitor features specific to the device and/or features relevant to the device's current state, one or more processors on the device may perform the following operations.

In block 401, the processor executing the device-specific feature generator may determine a set of device-specific features associated with one or more capabilities present on the mobile computing device. In an aspect, the processor executing the device-specific feature generator may recognize the device-specific features/capabilities upon initialization of the mobile computing device. For example, the processor executing the device-specific feature generator may determine at the startup of the mobile computing device that the device includes features/capabilities related to Bluetooth®, one or more WAN radios, and various input/output devices (e.g., cameras, speakers, a mouse, a keyboard, etc.). In another aspect, the processor executing the device-specific feature generator may recognize other functionalities and/or capabilities related to peripheral devices in communication with or controlled by the mobile computing device, such as a remote processing device or a remote printer.

In another aspect, the processor executing the device-specific feature generator may maintain a running list of features that are or have at one time been present on or connected to the mobile computing device. For example, the processor executing the device-specific feature generator may record that the mobile computing device included features related to a peripheral device that was previously installed and is now uninstalled. By including features that were previously present on or connected to the mobile computing device in the set of device-specific features, the device-specific feature generator may ensure that a device-specific lean classifier model received from the server includes former features in case those features are reintroduced or reactivated on the mobile computing device at a later time.

The set of device-specific features identified in block 401 may also include features related to anticipated capabilities that are expected to be present on the mobile computing device in the future. In an aspect, the processor executing the device-specific feature generator and/or the behavior analyzer unit may receive a list of one or more expected features in the form of a user input received from a user interface device, thereby enabling the mobile computing device's user to preemptively add features to the set of device-specific features that the user expects to be added to the device in the future. In such an aspect, the processor executing the behavior analyzer unit may not need to request an updated classifier from the server that includes the anticipated features when these anticipated features are activated at a later time.

In block 402, the processor executing the state-specific feature generator may determine a set of state-specific features associated with a state of the mobile computing device, such as by performing a scan of the device's current configuration, network connections, settings, parameters, etc. In an aspect, the processor executing the state-specific feature generator may receive information regarding the current state/configuration of the device from a processor executing the device-state monitoring engine, and the processor executing the state-specific feature generator may utilize this information to identify one or more features that are associated with the current state/configuration of the device as described above. In another aspect, the processor executing the state-specific feature generator may determine a set of state-specific features associated with a state of the mobile computing device based at least in part on a received user input that indicates a current or anticipated state of the mobile computing device. For example, the user input may indicate that the mobile computing device will soon switch to an unsecure, public network.

In block 403, the processor executing the behavior analyzer unit may generate information identifying the capability and state of the mobile computing device (i.e., identifying information) based on the set of device-specific features determined in block 401 and the set of state-specific features determined in block 402. In a further aspect of the operations performed in block 403, the processor executing the behavior analyzer unit may also include additional information in the indentifying information that identifies the mobile computing device (e.g., device ID number, model/serial number, etc.) sufficient to enable a server to identify the mobile computing device's state, capabilities, features, and/or characteristics, such as by using the information to perform a database look-up operation.

After generating the identifying information in block 403, the processor executing the behavior analyzer unit may send the generated information to the server in block 404, such as by utilizing or extending the API used to establish communications with the server.

In block 406, the processor executing the behavior analyzer unit may receive a device-specific lean classifier from the server based on the generated information sent to the server in block 404. As such, the device-specific lean classifier may include device-specific and state-specific features present on the mobile computing device. In an aspect, the processor executing the device-specific lean classifier model may be in the form of boosted decision stumps, and the processor executing the behavior analyzer unit may use the boosted decision stumps to classify a behavior of the mobile computing device as benign or malicious/performance-degrading as further described below with reference to block 412.

In block 408, the processor executing the behavior observer unit may monitor/observe the behavior of the mobile computing device features represented in the device-specific lean classifier model. The processor executing the behavior observer unit may record data related to the features as described above with reference to FIG. 2.

In an aspect, the processor executing the behavior observer unit may receive a lean classifier from the server that includes features related to anticipated capabilities and/or states, and thus may be capable of monitoring/observing those features when they are activated in the future without needing to obtain an updated classifier model from the server at that time.

The processor executing the behavior analyzer unit may generate behavior vectors for the mobile computing device's current configuration in block 410, such as by utilizing the observations received from the behavior observer as described above with reference to FIG. 2.

In block 412, the processor executing the classifier and/or the behavior analyzer unit 204 may apply the generated behavior vectors to the device-specific lean classifier received in block 406. For example, the processor executing the classifier and/or the behavior analyzer unit may apply values in the generated behavior vectors representing particular features to one or more boosted decision stumps included in the device-specific lean classifier that tests those particular features. As described above, the results of applying the behavior vector values to the boosted decision stump is a binary outcome, such as "yes" or "no," with each outcome assigned a weighted probability indicating a confidence factor that the behavior of the feature is benign or malicious.

In determination block 414, the processor executing the classifier and/or the behavior analyzer unit may determine whether the application of the generated behavior vectors to the device-specific lean classifier indicates the presence of malicious/performance-degrading behavior on the mobile computing device. In the above example, the processor executing the classifier and/or behavior analyzer unit may determine whether the mobile computing device is experiencing malicious behavior based on the results of applying the generated behavior vector to the boosted decision stumps in the device-specific lean classifier model.

When the processor executing the classifier determines that the mobile computing device is experiencing malicious behavior (i.e., determination block 414="Yes"), the processor executing the actuator unit may terminate the malicious behavior in block 416. To terminate the malicious behavior, the processor executing the actuator unit may restrict access to the related feature of the offending behavior, or identify the element responsible for the behavior and quarantine or delete the element. When the processor executing the behavior analyzer unit and/or classifier determines that the mobile computing device is not experiencing malicious behavior (i.e. determination block 414="No"), the process may continue in a loop as the processor executing the behavior observer may continue in block 408 by monitoring/observing the behavior of the mobile computing device features indicated by the device-specific lean classifier model received in block 406.

Figure 5A:
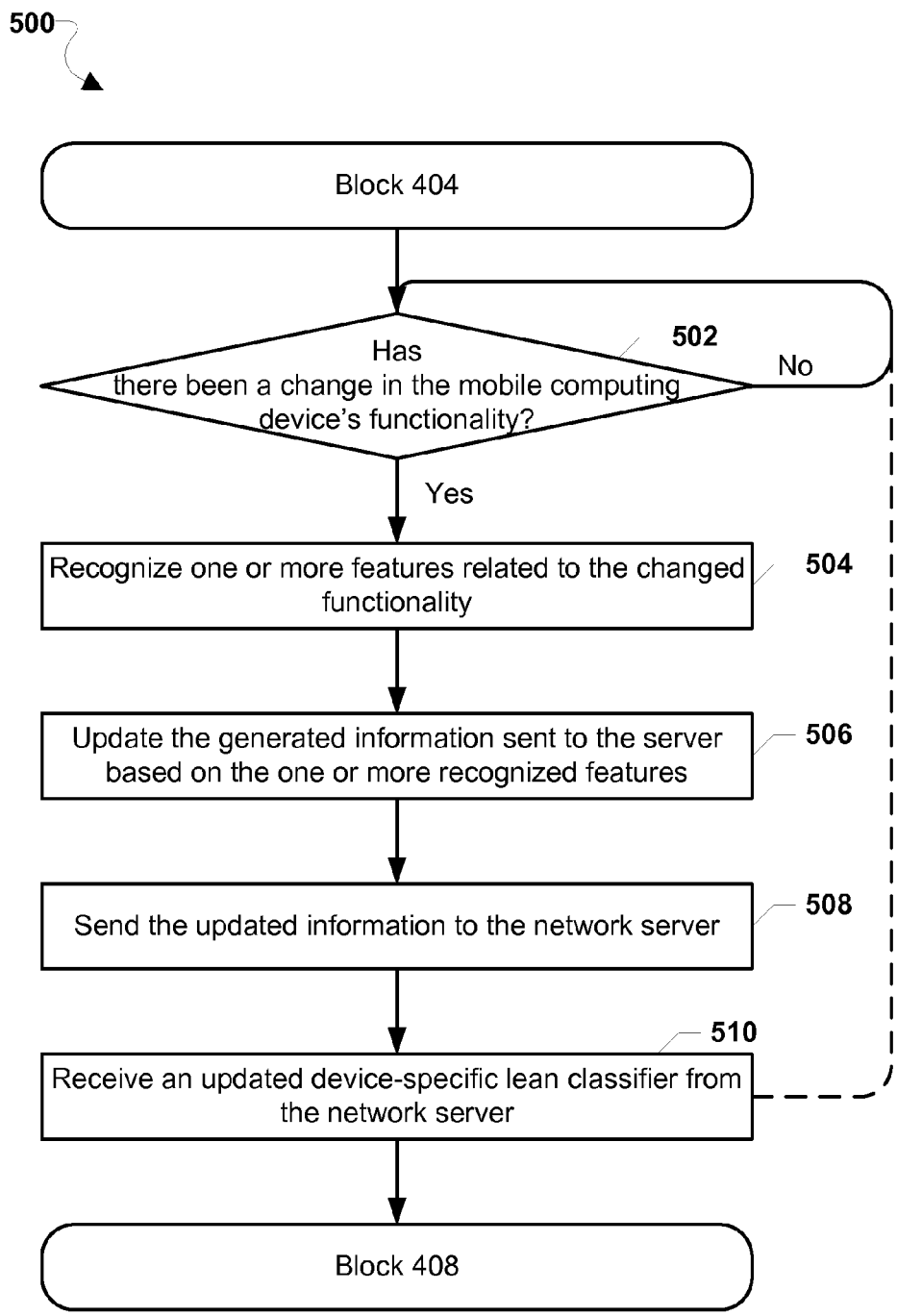
FIG. 5A is a process flow diagram illustrating an aspect method for requesting an updated device-specific lean classifier from a server in response to detecting a change in functionality of the mobile computing device.

FIG. 5A illustrates an aspect method 500 that may be implemented on a mobile computing device for requesting an updated device-specific lean classifier from a server in response to detecting a change in the functionality and/or capabilities of the device. The operations of method 500 implement an aspect of the operations of method 400 described above with reference to FIG. 4, and may begin after the processor executing the behavior analyzer unit sends identifying information for the mobile computing device to the server in block 404 of method 400.

As discussed above, the features/capabilities of the mobile computing device 102 may change dynamically as features are added and removed during normal operation of the mobile computing device. For example, a peripheral device (e.g., a Bluetooth® keyboard) may be added, or some other functionality originally present on the mobile computing device may be removed. In light of the dynamic nature of certain features on the mobile computing device, the device-specific lean classifier model may become out-of-date over time and may lead to a decline in efficiency or security. For instance, the mobile computing device may continue using a device-specific lean classifier model that includes features that have been removed from the mobile computing device, resulting in a waste of processing resources and battery power because the mobile computing device may needlessly attempt to monitor the removed features. Further, the mobile computing device may be at a heighten risk of malicious behavior by using a device-specific lean classifier model that does not include features that have been recently added to or activated on the device. Thus, to prevent the performance and security issues that may result from using an out-of-date device-specific lean classifier model, the mobile computing device may continually update the classifier model as further described herein.

In determination block 502, a processor executing the device-feature monitoring engine may determine whether there has been a change in the mobile computing device's functionality. In an aspect, the processor executing the device-feature monitoring engine may be configured to constantly or continually monitor the mobile computing device to determine when a functionality or capability related to a device-specific feature of the mobile computing device has been added or removed. In another aspect, the processor executing the device-feature monitoring engine may be configured to receive prompts that indicate when a functionality and/or feature is added or removed. For example, the processor executing the device-specific feature generator may be notified when an interrupt is received in the kernel space to connect or disconnect a peripheral device from the mobile computing device.

In an aspect, the processor executing the device-feature monitoring engine may determine that there has been a change in the mobile computing device's capabilities/functionality in response to receiving a user input (e.g., on a user input interface included on the device) indicating that a change has occurred. In a further aspect, the user input may indicate an anticipated change in the mobile computing device's capabilities. For example, the user input may indicate the user's intention to add a new peripheral device that may expand the mobile computing device's capabilities.

When the processor executing the device-feature monitoring engine determines that there has been no change to the functionality of the mobile computing device (i.e. determination block 502="No"), the processor may repeat the operations in determination block 502 in a loop until it recognizes a change in the device's functionality.

When the processor executing the device-feature monitoring engine determines that there has been a change in the functionality of the mobile computing device (i.e. determination block 502="Yes"), the processor executing the device-specific feature generator may recognize one or more features related to the change in the device's functionality/capabilities in block 504. In performing the operations of block 504, the processor executing the device-specific feature generator may receive an indication of the functionality that has changed from the processor executing the device-feature monitoring engine, and the processor executing the device-specific feature generator may correlate the functionality with one or more features to identify the features that have been affected by the change in functionality. For example, one peripheral device could be a set of wireless speakers and another peripheral device could be a wirelessly connected television. Both of these example peripheral devices functionally allow for streaming media; however, the device-specific feature generator may distinguish that the speakers may only stream audio media while the television may stream audio media, video media, and audio/video multimedia. Thus in this example, a change in only the functionality of streaming audio may lead the processor executing the device-specific feature generator to conclude that the feature affected by the change is the audio streaming to the wireless speakers and not to the wireless television.

In another aspect, the processor executing the device-specific feature generator may recognize one or more features related to the change in the device's functionality/capabilities based at least in part on user inputs. For example, a user input may identify particular features/capabilities added to the mobile computing device as a result of connecting a Square® device to the mobile computing device (i.e., the user input may indicate that the mobile computing device may now have the ability to read credit card information). In a further aspect, the user input may indicate particular capabilities that the user anticipates being added to the mobile computing device in the future, and the mobile computing device may include information regarding the features related to those anticipated capabilities as part of the updated information generated in block 506. For example, a user input may be in the form of an application installation or device registration for a Square® device, which may the processor executing the device-specific feature generator indicate this change in device features/capabilities even though the Square® device may not be plugged in. This capability enables the behavior analyzer unit to be ready to monitor the Square® device when it is eventually plugged into the mobile computing device.

In block 506, the processor executing the behavior analyzer unit may update the generated information sent to the server based on the one or more features recognized in block 504. The processor executing the behavior analyzer unit may also send the updated information to the server in block 508 by performing operations similar to those described above in block 404 of method 400 described above with reference to FIG. 4.

In block 510, the processor executing the behavior analyzer unit may receive from the server an updated device-specific lean classifier model, which may reflect the change in the mobile computing device's functionality/capabilities by including or excluding the one or more features recognized above in block 504 in the updated device-specific lean classifier. For example, the updated device-specific lean classifier may include additional features to cover features added as a result of plugging in a peripheral device (e.g., a keyboard or mouse) into the mobile computing device. The mobile computing device processor(s) may repeat the operations described above as the behavior observer may begin observing mobile computing device behavior for features included in the updated device-specific lean classifier model in block 408 of method 400 as described above with reference to FIG. 4. In an optional aspect, the process may also continue simultaneously in determination block 502 as the processor executing the device-feature monitoring engine may continue monitoring for changes in the mobile computing device's functionality.

Figure 5B:
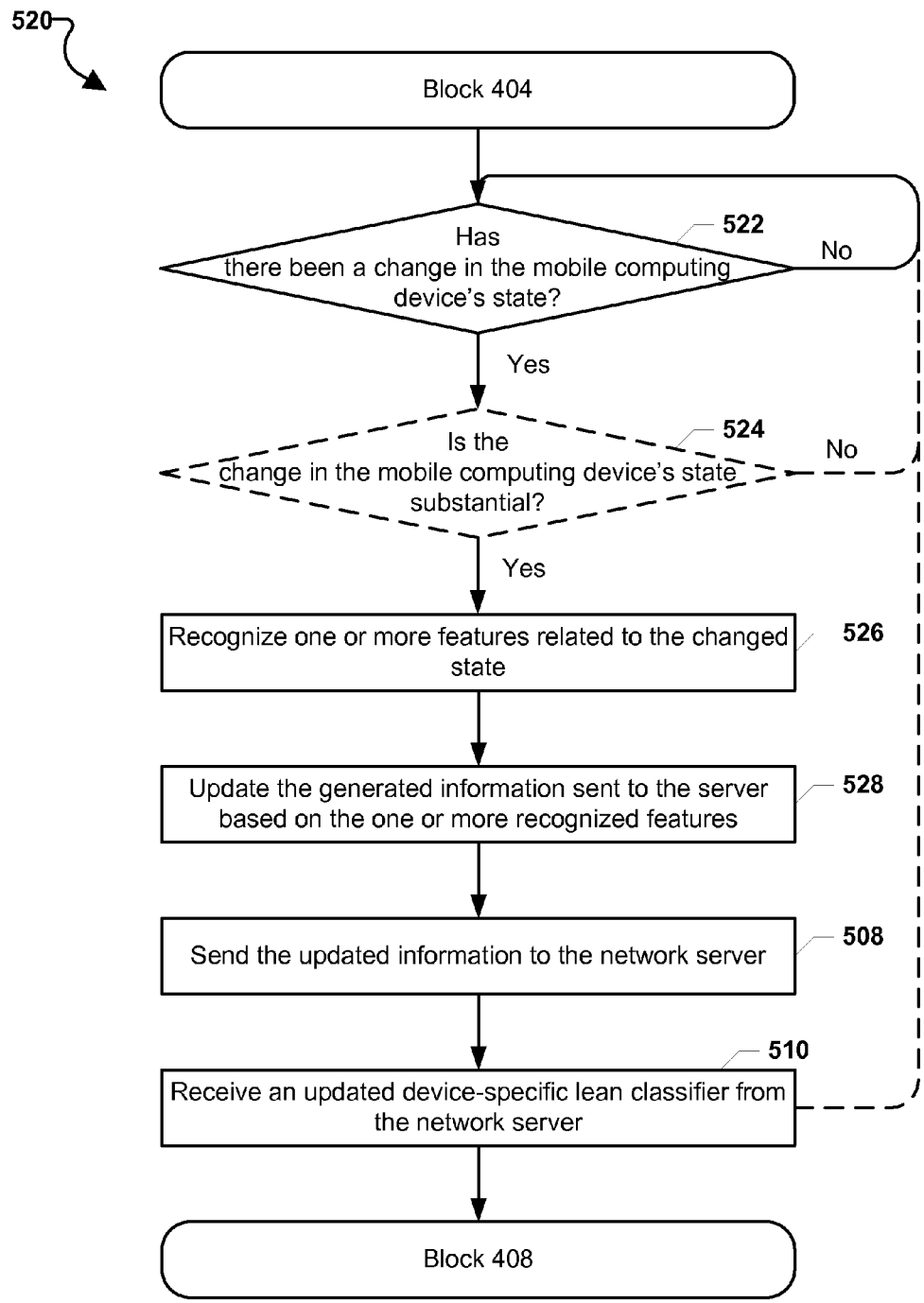
FIG. 5B is a process flow diagram illustrating an aspect method for requesting an updated device-specific lean classifier from a server in response to detecting a change in state of the mobile computing device.

FIG. 5B illustrates an aspect method 520 that may be implemented by a processor executing on a mobile computing device for requesting an updated device-specific lean classifier from a server in response to detecting a change in a dynamic state of the device. The operations of method 520 implement an aspect of the operations of method 400 described above with reference to FIG. 4, and may begin after the processor executing the behavior analyzer unit sends identifying information for the mobile computing device to the server in block 404 of method 400.

The state/configuration of a mobile computing device is constantly changing. In an aspect, every event occurring on the mobile computing device may change a state related to a particular feature. States may change, for example, when the mobile computing device becomes active or idle, makes a communication connection or ends a connection, or is plugged into a charger or unplugged so that it is running on the battery. States may change frequently, and as a result of such state changes, the behavior models (e.g., device-specific lean classifier models) used on the mobile computing device to detect malicious/performance-degrading activity may quickly become out of date as new features become present on the device or current features are disabled as a result of the device's state/configuration change. In an aspect, one or more processors executing on the device may perform the operations described below to ensure that the behavior models used on the mobile computing device reflect the various potential changes in the device's state to ensure that the device's device-specific lean classifier model includes features relevant to the device's current state.

In determination block 522, the processor executing the device-state monitoring engine may determine whether there has been a state change on the mobile computing device by monitoring all of the states of the device. In a further aspect, the processor executing the device-state monitoring engine may continuously, near-continuously, or continually monitor the mobile computing device's current states/configuration for changes. In another aspect, the processor executing the device-state monitoring engine may determine that a state change has occurred in response to receiving a user input on a user input interface included on the mobile computing device indicating such a change.

When the processor executing the device-state monitoring engine determines that there has been no change in the mobile computing device's state (i.e. determination block 522="No"), the processor may repeat the operations of determination block 522 described above until a change in the device's state is detected. In an aspect (not shown), when there is no change in the mobile computing device's state, the lean classifier model may be considered "up to date," and the processor executing the behavior observer unit may continue to monitor/observe the behavior of the mobile computing device features included in a current device-specific lean classifier, such as the device-specific lean classifier received in block 408 of method 400 described above with reference to FIG. 4.

In an aspect, the processor executing the device-state monitoring engine may only monitor a subset of the states of the mobile computing device and may ignore other states that may not be indicative of a feature that may contribute to or be involved in malicious behavior. For example, a state change may not be considered important and or may occur so quickly that it may not be effective to monitor (or stop monitoring) the related features. In a further aspect, what makes a state change substantial may be predetermined and substantial state changes may be identified by rules accessed by the processor executing the device-state monitoring engine. Thus, when the processor executing the device-state monitoring engine determines that there is a change in state (i.e. determination block 522="Yes"), the processor executing the device-state monitoring engine may optionally determine whether the change (or changes) in state of the mobile computing device were substantial in optional determination block 524. Examples of substantial state changes may include instances in which the mobile computing device has disconnected all wireless connection (e.g., when activating "Airplane Mode"), reduced security protocol levels when connected to a secure network access point, or entered/exited a roaming mode for cellular communication.

When the device processor executing the device-state monitoring engine optionally determines that the change/changes in state of the mobile computing device was/were not substantial (i.e. optional determination block 524="No"), the processor may repeat the above operations in a loop starting in determination block 522. In a further aspect (not shown), the processor executing the behavior observer unit may continue to monitor/observe the behavior of the mobile computing device features indicated by the current device-specific lean classifier model in block 410.

When the processor executing the device-state monitoring engine optionally determines that the change/changes in state of the mobile computing device was/were substantial (i.e. optional determination block 524="Yes"), the processor executing the state-specific feature generator may recognize features related to changed state in block 526. In an aspect, the processor executing the state-specific feature generator may receive a notification of a substantial state change (i.e., as a result of a processor performing the operations of optional determination block 524) from the processor executing the device-state monitoring engine, which may trigger the processor executing the state-specific feature generator to correlate or recognize a feature associated with the substantial state change. In an aspect, the correlations between features and substantial state changes may be direct correlations. For example, a state of a wireless connection being established over Wi-Fi may be directly related to a Wi-Fi feature of the mobile computing device. In another aspect, the correlations between the features and the substantial state changes may be tangential. For example, a state indicating a fast network connection may indicate better interaction with a cloud server, which may be involved with malicious behavior on the mobile computing device, such as offloading information to the cloud serve. In another aspect, the correlations may be indirect. For example, a battery charge state of the mobile computing device may be correlated to various sets of features. During a full battery charge state a broad set of features, including high and low priority features, may be monitored for malicious behaviors because the mobile computing device has sufficient power resources to handle monitoring the broad set of features. Similarly, during a low or depleted battery charge state a narrow set of features, including high priority features, may be may be monitored for malicious behaviors because the mobile computing device does not have sufficient power resources to handle monitoring the broad set of features.

In another aspect, the processor executing the state-specific feature generator may recognize features related to a changed state or an anticipated changed state based at least in part on a user input. For example, a user input may indicate that the user is enabling or will soon enable the Bluetooth® radio included on the mobile computing device.

In block 528, the processor executing the behavior analyzer unit may update the generated information sent to the server based on the one or more features related to the mobile computing device's changed state recognized in block 526. The behavior analyzer unit may also send the updated information to the server in block 508 as described above with reference to FIG. 5A.

In block 510, the processor executing the behavior analyzer may receive from the server an updated device-specific lean classifier model, which may reflect the change in state of the mobile computing device by including or excluding one or more features associated with the features related to the changed state as recognized in block 526.

The mobile computing device processor(s) may repeat the operations described above with reference to FIG. 4 starting in block 408 of method 400 as the processor executing the behavior observer may begin observing mobile computing device behavior for features included in the updated device-specific lean classifier model received in block 510. In an optional aspect, the process may also continue simultaneously in determination block 502 as the processor executing the device-feature monitoring engine may continue monitoring for changes in the mobile computing device's functionality.

Figure 6:
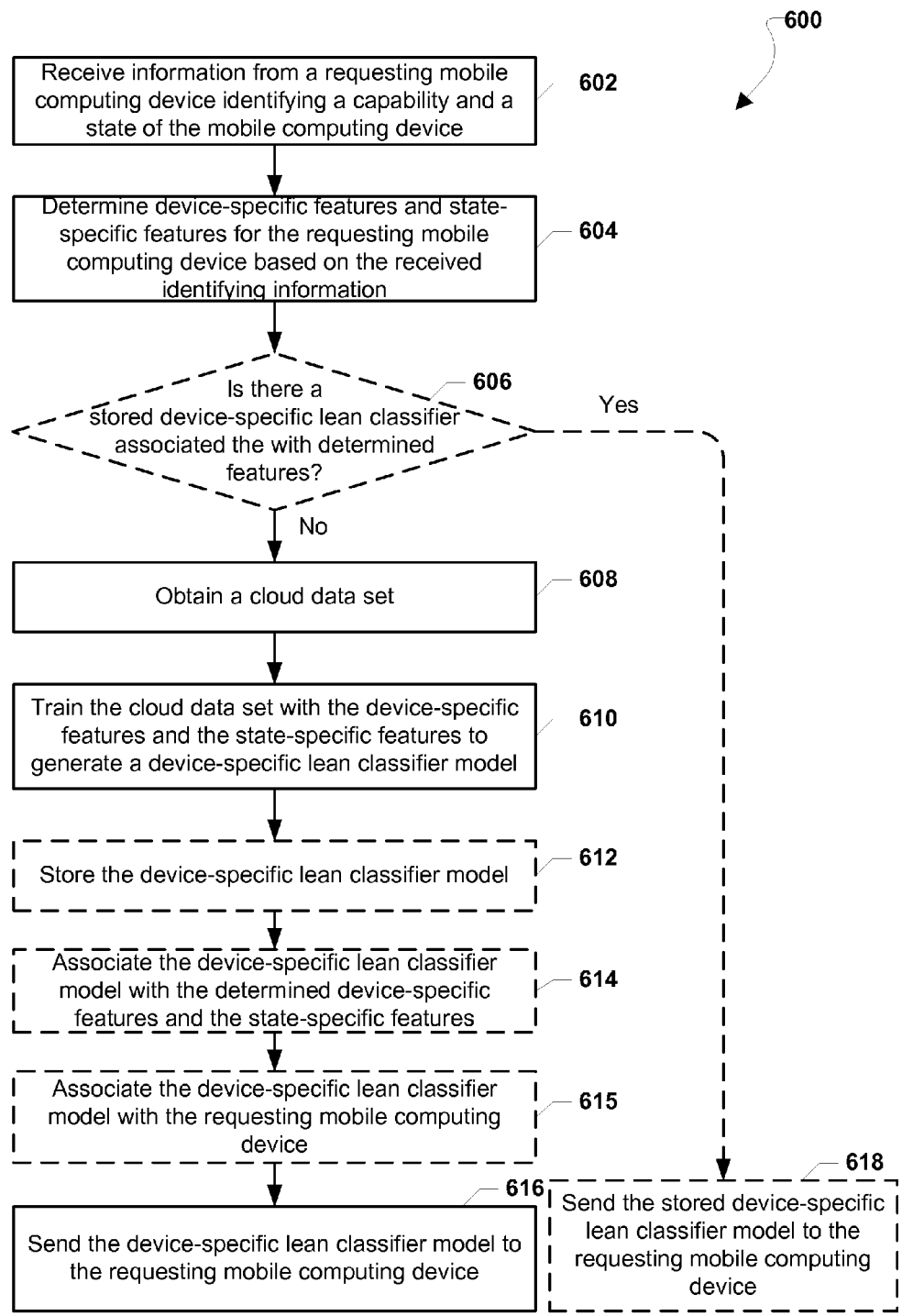
FIG. 6 is a process flow diagram illustrating an aspect method for sending a device-specific lean classifier model to a requesting mobile computing device in response to receiving identifying information from the requesting device.

FIG. 6 illustrates an aspect method 600 that may be implemented by a processor executing a model generator unit on a server for sending a device-specific lean classifier model to a mobile computing device in response to receiving information from the device that identifies the device and/or one or more of its capabilities, functionality, states, and features. As described above with reference to FIG. 3, the server processor executing the model generator unit may have access to a vast amount of crowd-sourced information (i.e., a cloud data set) that the server processor may use to create behavior classifiers. Given its access to such a large data set of behavioral information, the server processor executing the model generator unit may be particularly suited for generating lean classifier models that are specifically tailored for particular mobile computing devices. Thus, in an aspect, the model generator unit may provide highly effective and specialized, device-specific lean classifier models to mobile computing devices.

In block 602, the server processor executing the model generator unit may receive information from a requesting mobile computing device identifying the device's capability and state. In an aspect, the identifying information may include information (e.g., model numbers, serial numbers, versions, etc.) that the processor executing the model generator unit may use to determine the capabilities/functionalities of the requesting mobile computing device. For example, the identifying information may indicate that the requesting mobile computing device is an iPhone 5S® with a 16 gigabyte capacity and currently running iOS version 7.0.04.

In another aspect, the identifying information may include—in addition to or instead of the identifying information described above—information describing features, functionalities, capabilities, and/or the current state and/or configuration present on the requesting mobile computing device. For example, the identifying information may indicate that the mobile computing device is capable of connecting to a 4G cellular network (i.e., a capability/functionality of the device) and that the device is currently connected to a 4G cellular network (i.e., a current state/configuration of the device).

In block 604, the model generator unit may determine the device-specific features and the state-specific features for the requesting mobile computing device based on the identifying information received in block 602. In an aspect of the operations performed in block 604, the server processor executing the model generator unit may determine the device-specific features and/or the state-specific features of the requesting mobile computing device solely based on the received identifying information when the identifying information includes a set of device-specific features and/or a set of state-specific features present on the requesting mobile computing device. In another aspect, the model generator unit may access a device-specific classifier database and may retrieve features associated with the identifying information as described above. For example, the model generator unit may perform a lookup of the features associated with a particular model number or mobile computing device type included in the received device-identifying information. In another example, the server processor executing the model generator unit may also perform a lookup to identify features corresponding with the current state/configuration of the requesting mobile computing device as described in the received identifying information.

In optional determination block 606, the model generator unit may determine whether there is a stored device-specific lean classifier associated with the device-specific and state-specific features determined in block 604. In an optional aspect, the server processor executing the model generator unit may have previously stored device-specific lean classifier models generated for other mobile computing devices in the device-specific classifier database as further described below with reference to blocks 612, 614, and the server processor may attempt to recall a previously generated device-specific lean classifier models that matches the device-specific features and state-specific features of the instant mobile computing device instead of regenerating another device-specific lean classifier model based on the same features, thereby saving time and processing resources. Thus, many mobile computing devices of the same model/type may request a device-specific lean classifier model, and instead of generating a model from scratch for each of those mobile computing devices, the model generator unit may send a previously generated model that matches features and/or states/configurations currently present on the requesting mobile computing device.

When the server processor executing the model generator unit determines that there is a stored device-specific lean classifier model associated with the device-specific and state-specific features determined in block 604 (i.e., optional determination block 606="Yes"), the processor may send the stored device-specific lean classifier model to the requesting mobile computing device in optional block 618. Upon receiving the stored device-specific lean classifier model, the requesting mobile computing device may begin using the model to monitor for malicious behavior as described above with reference to FIG. 4.

When the server processor executing the model generator unit determines that there is no stored device-specific lean classifier model associated with the device-specific and state-specific features determined in block 604 (i.e., optional determination block 606="No"), the processor may obtain a cloud data set in block 608 that includes features present on multiple different models/types of mobile computing device. In an aspect, in performing the above operations in block 608, the model generator unit may retrieve the cloud data set from a cloud unit as described above with reference to FIG. 3. The model generator unit may also train the cloud data set obtained in block 608 with the device-specific features and state-specific features determined in block 604 to generate a device-specific lean classifier model in block 610. In other words, the model generator unit may process the cloud data set or a full classifier model developed from the cloud data set to filter out classifiers related to features that are irrelevant to and/or not currently present on the mobile computing device in order to generate a device-specific behavioral model that may enable the mobile computing device to efficiently and effectively monitor its features for malicious behavior. For example, the server processor executing the model generator unit may run a full machine-learning training algorithm using the device-specific features and state-specific features determined in block 604 to choose the classifier model that best represents the capabilities and/or state of the requesting mobile computing device. In a further aspect, the model generator unit may generate one or more sets of boosted decision stumps corresponding to each device-specific feature and state-specific feature.

In optional block 612, the server processor executing the model generator unit may store the device-specific lean classifier model produced in block 610, for example, by storing it in a device-specific classifier database (e.g., database 314) as described above. In optional block 614, the server processor executing the model generator unit may also associate the device-specific lean classifier model with the device-specific features and state-specific features determined above in block 604. In an aspect (not shown), the server processor executing the model generator unit may directly associate the device-specific lean classifier model with the capability and state identified in the information received in block 602 from the requesting mobile computing device. In another aspect, the server processor executing the model generator unit may manage the list of stored device-specific lean classifier models with features/capabilities associated with those models and/or those models' states using the device-specific classifier database. Organizing the device-specific classifier database in this manner may enable the generator to perform database lookup operations in the future to obtain stored device-specific lean classifier models matching the capabilities and/or states/configurations present on a requesting mobile computing device.

The server processor executing the model generator unit may also associate the device-specific lean classifier model with the requesting mobile computing device in optional block 615. In other words, the model generator unit may "register" the requesting mobile computing device by associating the device with the device-specific lean classifier model generated in block 610. Thus, in another aspect, the server processor executing the model generator unit may periodically generate updated classifier models for the requesting mobile computing device and send those updated classifier models to the requesting mobile computing device as further described below with reference to FIG. 7.

The server processor executing the model generator unit may send to the requesting mobile computing device the device-specific lean classifier model in block 616, which the device may begin using to monitor the features represented in the model for malicious behavior as described above with reference to FIG. 4.

Figure 7:
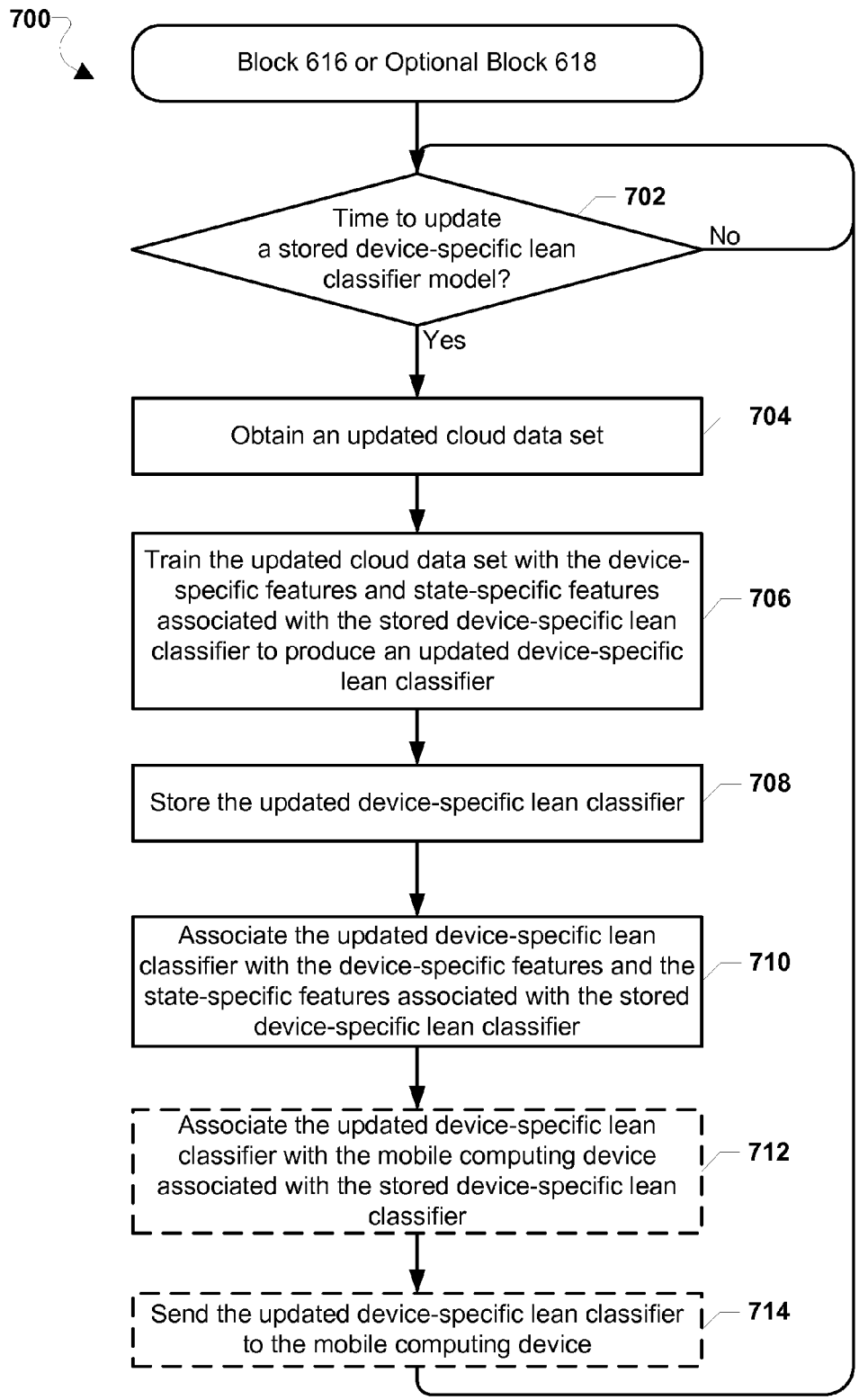
FIG. 7 is a process flow diagram illustrating an aspect method for updating device-specific lean classifier models.

FIG. 7 illustrates an aspect method 700 that may be implemented by a model generator unit operating on a server for updating device-specific lean classifiers. The operations of method 700 implement an aspect of the operations of method 600 described above with reference to FIG. 6, and the model generator unit may begin performing method 700 after sending a device-specific lean classifier model to the mobile computing device in block 616 or optional block 618 in method 600.

As mentioned above, device-specific lean classifier models may become out of date and increasingly unsuitable for use in monitoring for malicious behavior over time. Thus, in an aspect, the model generator unit may leverage its access to a continually updated source of new behavior data (i.e., the cloud data set) to generate updated device-specific lean classifier models that reflect the latest behavioral data and send such updated device-specific lean classifier models to the mobile computing device, thereby enabling the device to use the most up-to-date device-specific lean classifier model to detect malicious behaviors.

In determination block 702, the server processor executing the model generator unit may determine whether to update a stored device-specific lean classifier model that may be associated with a set of features and/or a particular mobile computing device as described above with reference to FIG. 6. In an aspect, the server processor executing the model generator unit may base its determination in determination block 702 on various conditions and mechanisms. For example, the server processor executing the model generator unit may implement a timer for each stored device-specific lean classifier that it may use to decide when to update the stored classifier model (i.e., after the timer has elapsed). In another example, the model generator unit may update a stored device-specific lean classifier model associated with a particular mobile computing device in response to receiving a request from that mobile computing device for an updated classifier. In another example, the model generator unit may determine that it is time to update the stored device-specific lean classifier model in response to receiving new behavior data from the cloud unit that is relevant to one or more features included in that stored classifier model.

When the server processor executing the model generator unit determines that it is not time to update the stored device-specific lean classifier model (i.e., determination block 702="No"), the server processor may repeat the operations in determination block 702 in a loop until it recognizes that it is time to update a stored device-specific lean classifier model. When the model generator unit determines that it is time to update the stored device-specific lean classifier model (i.e., determination block 702="Yes"), the generator may obtain an updated cloud data set in block 704, such as by requesting the latest crowd-sourced behavior data from the cloud unit as described above with reference to FIG. 3.

In block 706, the model generator unit may train the updated cloud data set with the device-specific features and state-specific features associated with the stored device-specific lean classifier to produce an updated device-specific lean classifier. In an aspect, the model generator unit may perform the operations of block 706 in a manner that is similar to training the cloud data set in block 610 as described above with reference to FIG. 6. In other words, the model generator unit may run a full machine learning training algorithm on the updated cloud data set or a full classifier developed from the updated cloud data set based on the device-specific features and the state-specific features associated with the stored device-specific lean classifier to generate an updated model that reflects the latest available behavior data.

After generating the updated device-specific lean classifier model, the model generator unit may store the updated model in block 708. In an aspect, in storing the updated model, the model generator unit may replace the earlier/previous model in the device-specific classifier database with the updated model. The model generator unit may also associate the updated device-specific lean classifier model with the device-specific features and state-specific features associated with the stored device-specific lean classifier in block 710. As discussed above with reference to optional block 614 of method 600 described with reference to FIG. 6, the server processor executing the model generator unit may manage a list of associations between stored device-specific lean classifier models and the features to which the models are associated. Thus, in a further aspect, the server processor executing the model generator unit may be able to send stored device-specific lean classifier models that include the most up-to-date data to mobile computing devices as described above with reference to FIG. 6.

In optional block 712, the model generator unit may associate the updated device-specific lean classifier model with the mobile computing device associated with the stored device-specific lean classifier. In an aspect, the model generator unit may also maintain a list of associations between mobile computing devices and device-specific lean classifier models in the device-specific classifier database, and the model generator unit may update the associations in the device-specific classifier database to reflect the new, updated behavior model that is now associated with the mobile computing device.

The server processor executing the model generator unit may optionally send the updated device-specific lean classifier to the mobile computing device in optional block 714, such as by "pushing" the updated model to the mobile computing device. Thus, in an aspect, the server processor executing the model generator unit may periodically send updated device-specific lean classifier models to those mobile computing devices that have previously received device-specific lean classifier models to enable the mobile computing devices to use the latest models when monitoring for malicious behavior. In another aspect, the server processor executing the model generator unit may have determined that it is time to update a stored device-specific lean classifier model associated with the mobile computing device in determination block 702 upon receiving a request from the mobile computing device for an updated model, and the generator unit may perform the above operations in order to send an updated model to the mobile computing device in optional block 714 in response to the received request.

Many existing solutions rely on the periodic execution of a computationally-intensive scanning engine on the mobile computing device, which may consume many of the mobile computing device's processing and battery resources, slow or render the mobile computing device useless for extended periods of time, and/or otherwise degrade the user experience. In addition, these solutions are typically limited to detecting known viruses and malware, and do not address the multiple complex factors and/or the interactions that often combine to contribute to a mobile computing device's degradation over time (e.g., when the performance degradation is not caused by viruses or malware). For these and other reasons, existing anti-virus, firewall, and encryption products do not provide adequate solutions for identifying the numerous factors that may contribute to a mobile computing device's degradation over time, for preventing mobile computing device degradation, or for efficiently restoring an aging mobile computing device to its original condition.

Other conventional solutions exist for modeling the behavior of an application program executing on a computing device, and these solutions may be used along with machine learning techniques to determine whether a software application is malicious or benign. However, these solutions are not suitable for use on mobile computing devices because they require evaluating a very large corpus of behavior information, do not generate behavior models dynamically, do not account for device-specific or device-state-specific features of the computing device, do not intelligently prioritize the features in the behavior model, are limited to evaluating an individual application program or process, and/or require the execution of computationally-intensive processes in the mobile computing device. As such, implementing or performing these existing solutions in a mobile computing device may have a significant negative and/or user-perceivable impact on the responsiveness, performance, or power consumption characteristics of the mobile computing device.

In other conventional solutions, a computing device may be configured to use an existing machine learning-based solution to access and use a large corpus of training data, derive a model that takes as input a feature vector, and use this model to determine whether a software application of the computing device is malicious or benign. However, such a solution does not generate a full classifier model (i.e., a robust data or behavior model) that describes the large corpus of behavior information in a format or information structure that may be used to quickly generate a lean classifier model. For at least this reason, such a solution does not allow a mobile computing device or server to generate a lean classifier model (or a family of lean classifier models) that includes, tests, or accounts for device-specific or device-state-specific features. In addition, this solution does not allow a mobile computing device or server to generate a lean classifier model that intelligently identifies or prioritizes the features in accordance to their relevance to classifying a specific behavior in the specific mobile computing device in which the model is used. For these and other reasons, such a solution cannot be used by a mobile computing device processor to quickly and efficiently identify, analyze, or classify a complex mobile computing device behavior without having a significant negative or user-perceivable impact on the responsiveness, performance, or power consumption characteristics of the mobile computing device.

In addition to the above-mentioned limitations of existing solutions, many behavior modeling solutions implement a "one-size-fits-all" approach to modeling the behaviors of a computing device. That is, these solutions typically generate behavior models so that they are generic to various models, types, versions, etc. of computing device and thus may be used in many computing devices and/or with a variety of different hardware and software configurations. As such, these generic behavior models often include a very large number of features, many that are not relevant to (and thus cannot be used for) identifying, analyzing, or classifying a behavior in a specific computing device in which they are actually used. In addition, these solutions do not assign relative priorities to features based their relevance to classifying a specific behavior in the specific mobile computing device in which the model is used.

Thus, such conventional systems do not consider that the features that are most important for determining whether a particular mobile computing device behavior is benign or not benign (e.g., malicious or performance-degrading) may be different for each mobile computing device. In other words, a different combination of features may be required for monitoring and/or analysis in each mobile computing device in order for that mobile computing device to quickly and efficiently determine whether a particular behavior is benign or not benign. Such conventional models also do not consider that the precise combination of features that require monitoring and analysis, and the relative priority or importance of each feature or feature combination, can often only be determined using device-specific and state-specific information obtained from the specific mobile computing device in which a behavior is to be monitored or analyzed. For example, if a first mobile computing device is configured to use its biometric sensors (e.g., fingerprint reader, voice recognition subsystem, retina scanner, etc.) to authorize financial transactions, then features that test conditions relating to the access and use of the biometric sensors are likely to be relevant in determining whether an observed behavior of accessing financial software is malicious or benign in that mobile computing device. On the other hand, features that test conditions relating to the access and use of these sensors are not likely to be relevant in determining whether the observed behavior of accessing financial software is malicious or benign in a second mobile computing device which is not configured to use its biometric sensors to authorize financial transactions. That is, since the first and second devices may be identical in all aspects (i.e., are the same type, model, operating system, software, etc.) except for their configuration for the use of their biometric sensors, it would be challenging to generate a generic behavior model that accurately identifies features that evaluate conditions relating to the access and use of the biometric sensors for both devices. It would be even more challenging to generate a generic model that tests much more complicated conditions or features on hundreds of thousands (or millions) of similarly equipped—yet independently configurable—mobile computing devices.

For all these reason, conventional solutions and models are not suitable for use in resource-constrained mobile computing devices because they may cause the mobile computing device processor to analyze a large number of disorganized, improperly prioritized, or irrelevant features that are not useful for identifying a cause or source of the mobile computing device's degradation over time. As such, these existing solutions are not suitable for use in complex-yet-resource-constrained mobile computing devices.

Figure 8:
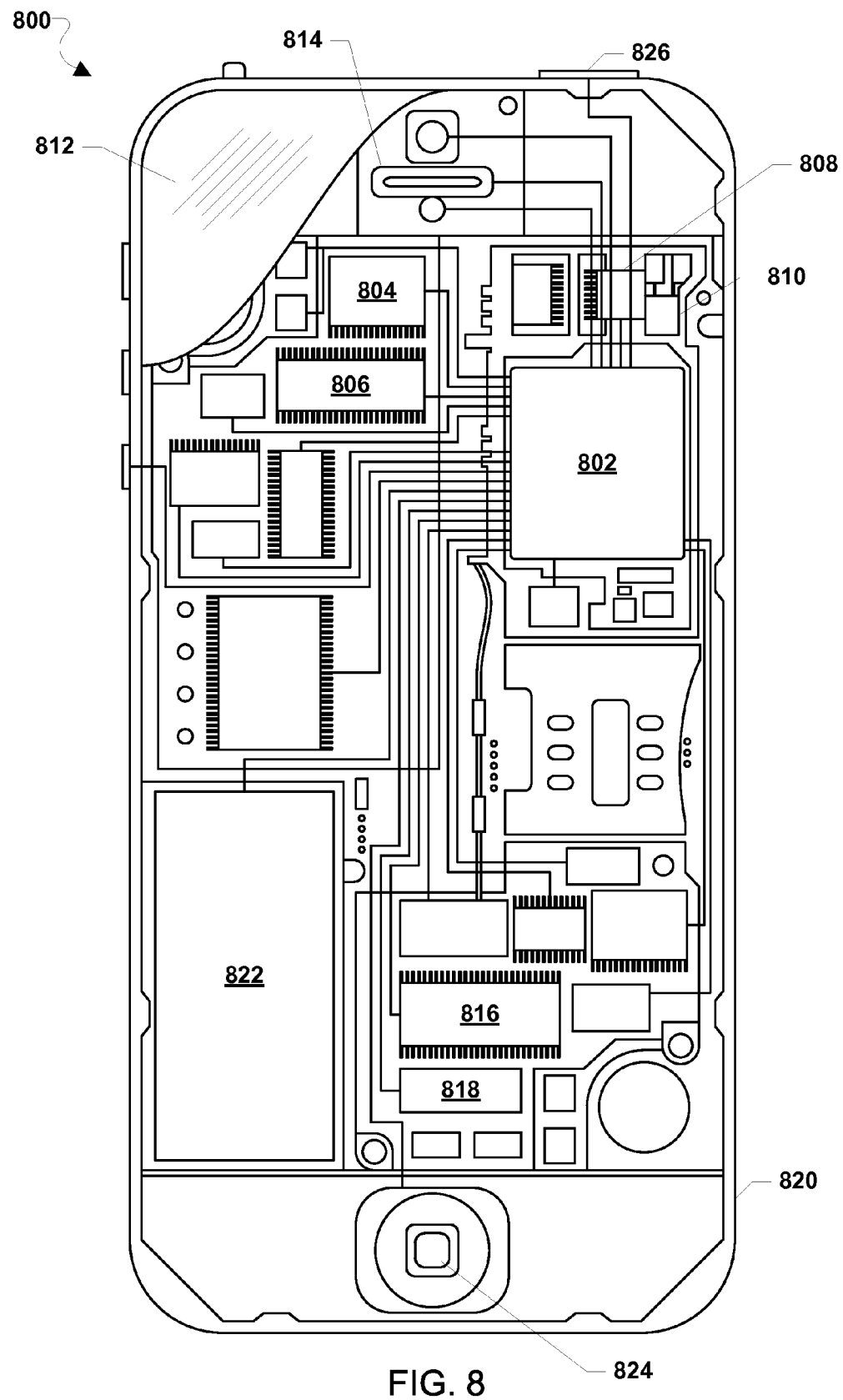
FIG. 8 is a component block diagram of a mobile computing device suitable for implementing an aspect method.

The various aspects may be implemented in any of a variety of mobile computing devices, an example of which is illustrated in FIG. 8. The mobile computing device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile computing device 800 need not have touch screen capability.

The mobile computing device 800 may have one or more radio signal transceivers 808 (e.g., Peanut, Bluetooth, Zigbee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components discussed herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

Figure 9:
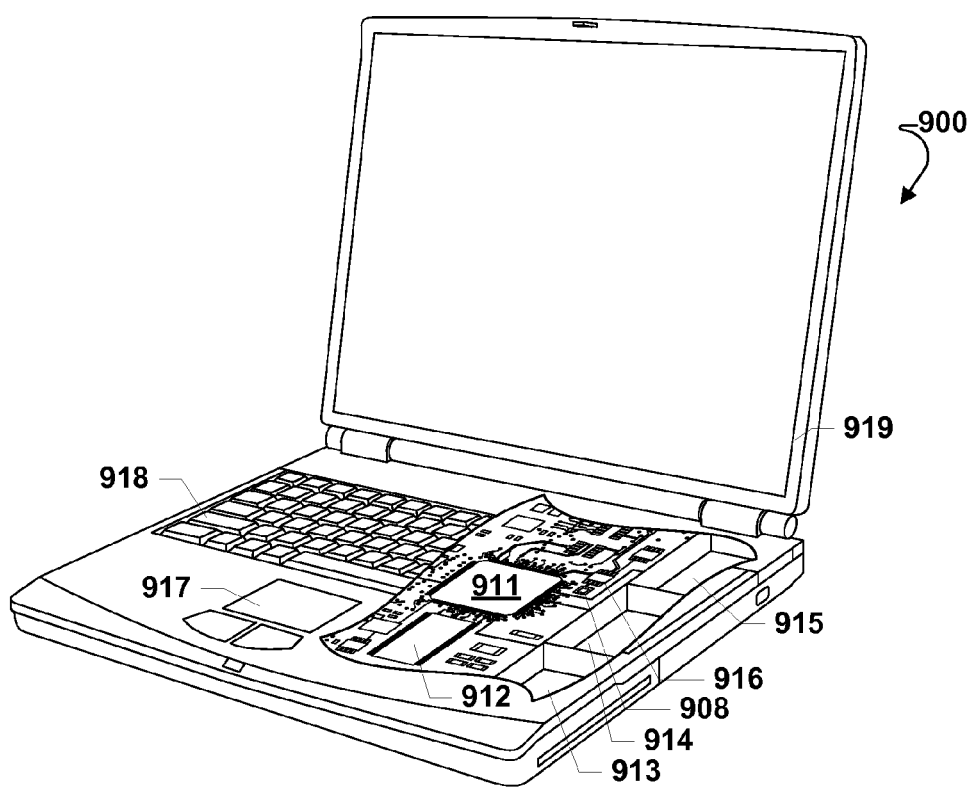
FIG. 9 is a component block diagram of another mobile computing device suitable for implementing an aspect method.

The various aspects described above may also be implemented within a variety of mobile computing devices, such as a laptop computer 900 illustrated in FIG. 9. Many laptop computers include a touchpad touch surface 917 that serves as the computer's pointing device, and thus may receive drag, scroll, and flick gestures similar to those implemented on mobile computing devices equipped with a touch screen display and described above. A laptop computer 900 will typically include a processor 911 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 911. The computer 900 may also include a floppy disc drive 914 and a compact disc (CD) drive 915 coupled to the processor 911. In a notebook configuration, the computer housing includes the touchpad 917, the keyboard 918, and the display 919 all coupled to the processor 911. Other configurations of the mobile computing device may include a computer mouse or trackball coupled to the processor (e.g., via a USB input) as are well known, which may also be use in conjunction with the various aspects.

Figure 10:
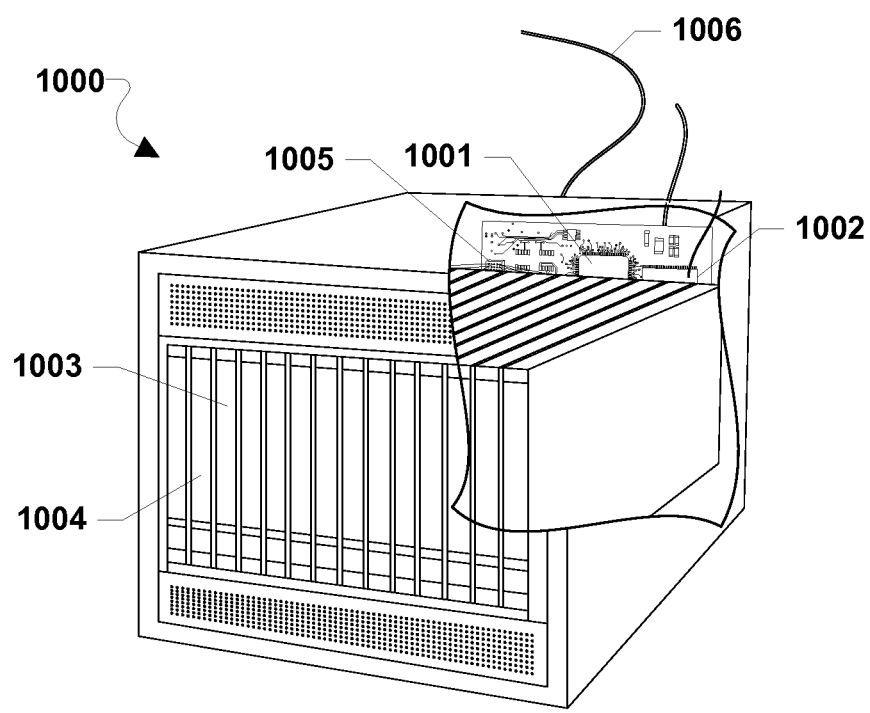
FIG. 10 is a component block diagram of a server suitable for implementing an aspect method.

Portions of the aspect methods may be accomplished in a client-server architecture with some of the processing occurring in a server. Such aspects may be implemented on any of a variety of commercially available server devices, such as the server 1000 illustrated in FIG. 10. Such a server 1000 typically includes a processor 1001 configured with server-executable instruction to perform the aspect methods. The processor 1001 are typically coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1005 coupled to the processor 1001 for establishing data connections with a network 1006, such as a local area network coupled to other broadcast system computers and servers. The processor 1001 may be any programmable microprocessor, microcomputer or multiple processor chip or chips that can be configured by software instructions (applications) to perform a variety of functions, including the functions of the various aspects described above. Typically, software applications may be stored in the internal memory 1002, 1003 before they are accessed and loaded into the processor 1001. The processor 1001 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a mobile computing device and the mobile computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of mobile computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

The functions described in one or more aspects may be implemented in hardware, software, firmware, or any combination thereof. If implemented in software, the functions may be stored as one or more processor-executable or server-executable instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of generating a lean classifier model on a server for use by a mobile computing device in monitoring for malicious behaviors, comprising:
   receiving, on the server, information from the mobile computing device identifying at least one capability and a state of the mobile computing device;
   obtaining a cloud data set of information collected from a plurality of other mobile computing devices;
   generating, on the server, a lean classifier model specific to the mobile computing device, wherein generating the mobile computing device-specific lean classifier model comprises filtering the cloud data set of information based on the at least one capability and the state of the mobile computing device; and
   sending, from the server to the mobile computing device, the mobile computing device-specific lean classifier model,
   wherein the mobile device-specific lean classifier model comprises a processor-executable information structure configured to enable a system reliability module on the mobile computing device to classify behavior of the mobile computing device, wherein classifying behavior comprises analyzing features specific to the at least one capability and the state of the mobile computing device.

2. The method of claim 1, further comprising:
   determining on the server whether there is a stored lean classifier model associated with the at least one capability and the state of the mobile computing device, wherein:
      generating the mobile computing device-specific lean classifier model comprises retrieving the stored lean classifier model in response to determining that there is a stored lean classifier model associated with the at least one capability and the state of the mobile computing device; and
      sending the mobile computing device-specific lean classifier model from the server to the mobile computing device comprises sending the stored lean classifier model from the server to the mobile computing device in response to determining that there is a stored classifier model associated with the at least one capability and the state of the mobile computing device.

3. The method of claim 1, wherein generating on the server a mobile computing device-specific lean classifier model further comprises training the cloud data set of information with the information received from the mobile computing device identifying the at least one capability and the state of the mobile computing device.

4. The method of claim 1, further comprising:
   storing the lean classifier model in the server;
   determining, on the server, whether to update the stored lean classifier model; and
   in response to determining to update the stored lean classifier model:
      training an updated cloud data set on the server with the information received from the mobile computing device identifying the at least one capability and the state of the mobile computing device to produce an updated lean classifier model; and
      sending the updated lean classifier model from the server to the mobile computing device.

5. The method of claim 1, further comprising:
   determining, on the mobile computing device, a set of device-specific features associated with the at least one capability of the mobile computing device;
   determining, on the mobile computing device, a set of state-specific features associated with the state of the mobile computing device,
   generating, on the mobile computing device, the information identifying the at least one capability and the state of the mobile computing device based on the set of device-specific features and the set of state-specific features; and
   sending the generated information from the mobile computing device to the server.

6. The method of claim 5, further comprising:
   determining, on the mobile computing device, whether a change in functionality on the mobile computing device has been detected;
   determining, on the mobile computing device, whether a change in state of the mobile computing device has been detected; and
   in response to detecting a change in at least one of functionality and state:
      updating the generated information in the mobile computing device;
      sending updated information from the mobile computing device to the server; and
      receiving, on the mobile computing device, an updated lean classifier model from the server based on the updated information and in response to sending the updated information.

7. The method of claim 5, further comprising receiving, on the mobile computing device, a user input indicating the at least one capability and the state of the mobile computing device, wherein:
   determining the set of device-specific features and the set of state-specific features on the mobile computing device is based on the user input.

8. The method of claim 7, wherein receiving, on the mobile computing device, a user input indicating the at least one capability and the state of the mobile computing device comprises receiving on the mobile computing device a user input indicating at least one anticipated capability and an anticipated state of the mobile computing device.

9. A server, comprising:
   a processor configured with processor-executable instructions to perform operations comprising:
      receiving information from a mobile computing device identifying at least one capability and a state of the mobile computing device;

obtaining a cloud data set of information collected from a plurality of other mobile computing devices;

generating a lean classifier model specific to the mobile computing device, wherein generating the mobile computing device-specific lean classifier model comprises filtering the cloud data set of information based on the at least one capability and the state of the mobile computing device; and sending the mobile computing device-specific lean classifier model to the mobile computing device, wherein the mobile computing device-specific lean classifier model comprises a processor-executable information structure configured to enable a system reliability module on the mobile computing device to classify behavior of the mobile computing device, wherein classifying behavior comprises analyzing features that are specific to the at least one capability and the state of the mobile computing device.

10. The server of claim 9, wherein:

the processor is configured with processor-executable instructions to perform operations further comprising determining whether there is a stored lean classifier model associated with the at least one capability and the state of the mobile computing device, wherein:

the processor is configured with processor-executable instructions such that generating the mobile computing device-specific lean classifier model comprises retrieving the sorted lean classifier model in response to determining that there is a stored lean classifier model associated with the at least one capability and the state of the mobile computing device; and sending the mobile computing device-specific lean classifier model to the mobile computing device comprises sending the stored lean classifier model to the mobile computing device in response to determining that there is a stored classifier model associated with the at least one capability and the state of the mobile computing device.

11. The server of claim 9, wherein the processor is configured with processor-executable instructions to perform operations such that generating a mobile computing device-specific lean classifier model further comprises training the cloud data set of information with the information received from the mobile computing device identifying the at least one capability and the state of the mobile computing device.

12. The server of claim 9, wherein the processor is configured with processor-executable instructions to perform operations further comprising:

storing the lean classifier model in memory;

determining whether to update the stored lean classifier model; and in response to determining to update the stored lean classifier model:

training an updated cloud data set with the information received from the mobile computing device identifying the at least one capability and the state of the mobile computing device to produce an updated lean classifier model; and sending the updated lean classifier model to the mobile computing device.

13. A system, comprising:

a server comprising a server processor; and a mobile computing device comprising:

a memory;

a transceiver configured to communicate with a network coupled to the server; and a mobile computing device processor coupled to the memory and the transceiver, wherein:

the mobile computing device processor is configured with processor-executable instructions to perform operations comprising sending information identifying at least one capability and a state of the mobile computing device to the server; and the server processor is configured with processor-executable instructions to perform operations comprising:

receiving the information from the mobile computing device identifying the at least one capability and the state of the mobile computing device;

obtaining a cloud data set of information collected from a plurality of other mobile computing devices;

generating a lean classifier model specific to the mobile computing device, wherein generating the mobile computing device-specific lean classifier model comprises filtering the cloud data set of information based on the at least one capability and the state of the mobile computing device; and sending the mobile computing device-specific lean classifier model to the mobile computing device, wherein the mobile computing device-specific lean classifier model comprises a processor-executable information structure configured to enable a system reliability module on the mobile computing device to classify behavior of the mobile computing device, wherein classifying behavior comprises analyzing features that are specific to the at least one capability and the state of the mobile computing device.

14. The system of claim 13, wherein:

the server processor is configured with server-executable instructions to perform operations further comprising determining whether there is a stored lean classifier model associated with the at least one capability and the state of the mobile computing device;

the server processor is configured with server-executable instructions such that generating the mobile device-specific lean classifier model comprises retrieving the stored lean classifier model in response to determining that there is a stored lean classifier model associated with the at least one capability and the state of the mobile computing device; and the server processor is configured with server-executable instructions to perform operations such that sending the mobile computing device-specific lean classifier model to the mobile computing device comprises sending the stored lean classifier model to the mobile computing device in response to determining that there is a stored classifier model associated with the at least one capability and the state of the mobile computing device.

15. The system of claim 13, wherein the server processor is configured with processor-executable instructions to perform operations such that generating a mobile computing device-specific lean classifier model further comprises training the cloud data set of information with the information received from the mobile computing device identifying the at least one capability and the state of the mobile computing device.

16. The system of claim 13, wherein the server processor is configured with processor-executable instructions to perform operations further comprising:
   storing the lean classifier model in memory;
   determining whether to update the stored lean classifier model; and
   in response to determining to update the stored lean classifier model:
      training an updated cloud data set with the information received from the mobile computing device identifying the at least one capability and the state of the mobile computing device to produce an updated lean classifier model; and
      sending the updated lean classifier model to the mobile computing device.

17. The system of claim 13, wherein the mobile computing device processor is configured with processor-executable instructions to perform operations such that sending information identifying at least one capability and a state of the mobile computing device to the server comprises:
   determining a set of device-specific features associated with at least one capability present on the mobile computing device;
   determining a set of state-specific features associated with a state of the mobile computing device;
   generating the information identifying the at least one capability and the state of the mobile computing device based on the set of device-specific features and the set of state-specific features; and
   sending the generated information to the server.

18. The system of claim 17, wherein the mobile computing device processor is configured with processor-executable instructions to perform operations further comprising:
   determining whether a change in functionality on the mobile computing device has been detected;
   determining whether a change in state of the mobile computing device has been detected; and
   in response to detecting a change in at least one of functionality and state:
      updating the generated information;
      sending updated information to the server; and
      receiving an updated lean classifier model from the server based on the updated information and in response to sending the updated information.

19. The system of claim 17, wherein:
the mobile computing device processor is configured with processor-executable instructions to perform operations further comprising receiving a user input indicating the at least one capability and the state of the mobile computing device; and
the mobile computing device processor is configured with processor-executable instructions to perform operations such that:
   determining the set of device-specific features and the set of state-specific features on the mobile computing device is based on the user input.

20. The system of claim 19, wherein the mobile computing device processor is configured with processor-executable instructions to perform operations such that receiving a user input indicating the at least one capability and the state of the mobile computing device comprises receiving a user input indicating at least one anticipated capability and an anticipated state of the mobile computing device.

* * * * *